(12) United States Patent
Ishiguro

(10) Patent No.: US 8,477,273 B2
(45) Date of Patent: Jul. 2, 2013

(54) VA-MODE LIQUID-CRYSTAL DISPLAY DEVICE

(75) Inventor: Makoto Ishiguro, Minami-ashigara (JP)

(73) Assignee: FUJIFILM Corporation, Minato-ku, Tokyo (JP)

( * ) Notice: Subject to any disclaimer, the term of this patent is extended or adjusted under 35 U.S.C. 154(b) by 276 days.

(21) Appl. No.: 12/877,265

(22) Filed: Sep. 8, 2010

(65) Prior Publication Data

US 2011/0058131 A1 Mar. 10, 2011

(30) Foreign Application Priority Data

Sep. 9, 2009 (JP) ................................. 2009-208710
Sep. 30, 2009 (JP) ................................. 2009-226219

(51) Int. Cl.
*G02F 1/1335* (2006.01)
(52) U.S. Cl.
USPC ........................................... 349/117; 349/96
(58) Field of Classification Search
None
See application file for complete search history.

(56) References Cited

U.S. PATENT DOCUMENTS

| 7,911,570 | B2* | 3/2011 | Uesaka et al. | 349/119 |
| 2004/0257498 | A1* | 12/2004 | Uesaka et al. | 349/98 |
| 2005/0185124 | A1* | 8/2005 | Kadoya | 349/117 |
| 2007/0195226 | A1* | 8/2007 | Aminaka et al. | 349/96 |
| 2008/0123031 | A1* | 5/2008 | Homma et al. | 349/112 |
| 2008/0143928 | A1* | 6/2008 | Fukagawa | 349/96 |

FOREIGN PATENT DOCUMENTS

| JP | 2006-184640 A | 7/2006 |
| JP | 2006-241293 A | 9/2006 |

* cited by examiner

*Primary Examiner* — Tina Wong
(74) *Attorney, Agent, or Firm* — Buchanan Ingersoll & Rooney PC

(57) ABSTRACT

The present invention relates to a VA-mode liquid-crystal display device comprising a front-side polarizing element (14), a rear-side polarizing element (12), and a VA-mode liquid-crystal cell (LC) disposed between the front-side polarizing element and the rear-side polarizing element, wherein the VA-mode liquid-crystal cell comprises a front-side substrate (24), a rear-side substrate (22), and a liquid-crystal layer (10) disposed between them, wherein the ratio of the member-contrast ratio ($CR_f$) of the front-side substrate (22) to the member-contrast ratio ($CR_r$) of the rear-side substrate, $CR_f/CR_r$ satisfies $3 \leq CR_f/CR_r$, and wherein the rear-side polarizing element (12) is directly stuck to the VA-mode liquid-crystal cell (LC).

17 Claims, 2 Drawing Sheets

(a)                                    (b)

*4 Examples where the rear-side substrate 4 was used.
*3 Examples where the rear-side substrate 3 was used.
*2 Examples where the rear-side substrate 2 was used.
*1 Examples where the rear-side substrate 1 was used.

US 8,477,273 B2

VA-MODE LIQUID-CRYSTAL DISPLAY DEVICE

CROSS-REFERENCE TO RELATED APPLICATIONS

This application claims benefit of priority under 35 U.S.C. 119 to Japanese Patent Applications No. 2009-208710 filed on Sep. 9, 2009 and No. 2009-226219 filed on Sep. 30, 2009; and the entire contents of the application are incorporated herein by reference.

BACKGROUND OF THE INVENTION

1. Field of the Invention

The present invention relates to a VA (vertically aligned)-mode liquid-crystal display device improved in the front contrast ratio.

2. Background Art

These days elevation of the contrast ratio (CR) in liquid-crystal display devices is being promoted. In particular, a VA-mode liquid-crystal display device has the advantage that CR in the normal direction (hereinafter referred to as "front CR") is high as compared with that in other modes, and various studies and developments are now made for further enhancing the advantage. As a result, in these 6 years, the front CR in VA-mode liquid-crystal display devices has increased from about 400 to about 8000, or by about 20 times.

On the other hand, in liquid-crystal display devices, it is important that not only the front CR is high but also CR in oblique directions (hereinafter this may be referred to as "viewing angle CR") is high. Various techniques of using a retardation film have been proposed for reducing the light leakage in oblique directions at the time of black level of display in VA-mode liquid-crystal display devices (for example, JP-A 2006-184640). In general, a retardation film is disposed on both the front side and the rear side of the liquid-crystal cell existing in the center therebetween, in which the two retardation films share the retardation necessary for optical compensation in the display device. In general, two systems are employed for the combination for optical compensation. In one system, the retardation films each separately disposed on the front side and on the rear side equally share the same retardation; and the advantage of the system is that the films of the same type can be used therein. In the other system, the retardation film disposed on either one side is made to share a larger retardation; and the system is advantageous in point of the cost since it enables optical compensation by the use of a combination of inexpensive retardation films. In the latter system, in general, the retardation film to be disposed on the rear side is made to share a larger retardation in practical use. One reason is the production cost. Regarding this reason, JP-A-2006-241293 recites as follows in the paragraph [0265]; "In case where the cellulose acylate film of the invention is used only as the protective film of one polarizer (between the liquid-crystal cell and the polarizing film), this may be on either side of the upper polarizer (viewers' side) or the lower polarizer (backlight side) with no functional problem. However, when it is used on the side of the upper polarizer, the functional film must be provided on the viewers' side (upper side) and the producibility may be thereby lowered, and therefore, it may be used on the side of the lower polarizer in many cases, and this may be a more preferred embodiment." The second reason is that disposing the film having a larger retardation on the rear side is preferred from the viewpoint of the impact resistance and the resistance to environmental change including temperature change and humidity change.

Heretofore, nothing has been investigated about the relationship between the optical properties and the front CR of the retardation film used for improving the viewing angle contrast ratio.

SUMMARY OF THE INVENTION

For high-CR liquid-crystal display devices, it is difficult to further elevate the contrast ratio therein according to the techniques heretofore proposed based on the factors of CR reduction. The present inventor has assiduously studied and, as a result, has known that in a VA-mode liquid-crystal display device, the retardation of the retardation layer existing between the rear-side polarizing element and the liquid-crystal cell, which heretofore has not been considered to have some influence on the front CR, is one factor of reducing the front CR.

An object of the present invention is to provide a VA-mode liquid-crystal display device having a high front contrast ratio.

Another object is to further increase the front contrast ratio of a VA-mode liquid-crystal display device of which the front contrast ratio is 1500 or more.

The present inventor has assiduously studied and, as a result, has found that, when any member having retardation is not present between the rear-side polarizing element and the VA-mode liquid-crystal cell, then the front CR of the VA-mode liquid-crystal display device can be significantly increased. Based on this finding, the inventor has further studied and, as a result, have found that the front CR-increasing effect by the absence of a retardation member between the rear-side polarizing element and the VA-mode liquid-crystal cell is remarkable in an embodiment where the contrast ratio of the member disposed on the inner surface of the front-side substrate of the VA-mode liquid-crystal cell is higher than the contrast ratio of the member disposed on the inner surface of the rear-side substrate thereof; and based on this finding, the inventor has further studied and has completed the present invention.

The means for achieving the above-mention object are as follows.

[1] A VA-mode liquid-crystal display device comprising at least a front-side polarizing element, a rear-side polarizing element, and a VA-mode liquid-crystal cell disposed between the front-side polarizing element and the rear-side polarizing element;

wherein the VA-mode liquid-crystal cell comprises a front-side substrate, a rear-side substrate, and a liquid-crystal layer disposed between them, wherein the ratio of the member-contrast ratio ($CR_f$) of the front-side substrate to the member-contrast ratio ($CR_r$) of the rear-side substrate, $CR_f/CR_r$ satisfies the following relational formula:

$$3 \leq CR_f/CR_r,$$

wherein the rear-side substrate and the front-side substrate include any constitutive member(s) of the VA-mode liquid-crystal cell disposed on the respective substrates, and wherein the rear-side polarizing element is directly stuck to the VA-mode liquid-crystal cell.

[2] The VA-mode liquid-crystal display device according to [1], which has a retardation region comprising one or more retardation layers between the front-side polarizing element and the VA-mode liquid-crystal cell, and wherein the retardation region satisfies the following formulae:

$$30 \text{ nm} \leq Re(550) \leq 90 \text{ nm, and}$$

$$170 \text{ nm} \leq Rth(550) \leq 300 \text{ nm}.$$

[3] The VA-mode liquid-crystal display device according to [2], wherein the retardation region satisfies the following formula:

$$\Delta nd(550)-70 \leq Rth(550) \leq \Delta nd(550)-10,$$

in which d means the thickness (nm) of the liquid-crystal layer of the VA-mode liquid-crystal cell; $\Delta n(\lambda)$ means the refractivity anisotropy of the liquid-crystal layer of the VA-mode liquid-crystal cell at a wavelength $\lambda$; $\Delta nd(\lambda)$ means the product of $\Delta n(\lambda)$ and d; and $Rth(\lambda)$ means the retardation (nm) in the thickness direction of the retardation region at a wavelength $\lambda$.

[4] The VA-mode liquid-crystal display device according to [2] or [3], wherein the retardation region is a cellulose acylate film or comprises a cellulose acylate film.

[5] The VA-mode liquid-crystal display device according to [2] or [3], wherein the retardation region is a cyclic olefin polymer film or comprises a cyclic olefin polymer film.

[6] The VA-mode liquid-crystal display device according to any one of [1]-[5], which comprises a backlight unit sequentially emitting independent three primary colors and is operated according to a field sequential operation mode.

[7] The VA-mode liquid-crystal display device according to any one of [1]-[6], wherein the VA-mode liquid-crystal cell has a color filter layer and wherein the color filter layer is disposed between the liquid-crystal layer and the rear-side polarizing element.

[8] The VA-mode liquid-crystal display device according to any one of [1]-[7], which has a front contrast ratio of at least 1500.

According the invention, it is possible to provide a VA-mode liquid-crystal device having a high front contrast ratio.

Figure 1:
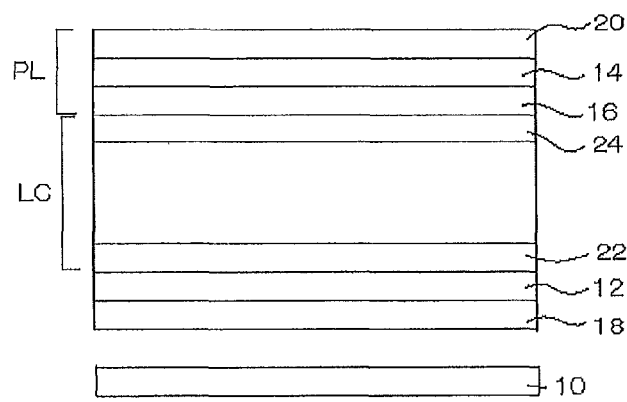
FIG. 1 is a schematic cross-sectional view of one example of the VA-mode liquid-crystal display device of the invention.

In the drawings, the reference numerals have the following meanings.

| | |
|---|---|
| 10 | Backlight |
| 12, 14 | Polarizing Element |
| 16 | Retardation Film |
| 18, 20 | Outer Protective Film |
| 22, 24 | Liquid-Crystal Cell Substrate |
| LC | VA-mode Liquid-Crystal Cell |
| PL | Front-Side Polarizer |

DETAILED DESCRIPTION OF THE INVENTION

The invention is described in detail hereinunder. Note that, in this patent specification, any numerical expressions in a style of " . . . to . . . " will be used to indicate a range including the lower and upper limits represented by the numerals given before and after "to", respectively.

At first, the terms used in the description will be explained.
(Retardation, Re and Rth)

In this description, $Re(\lambda)$ and $Rth(\lambda)$ are retardation in plane (nm) and retardation along the thickness direction (nm), respectively, at a wavelength of $\lambda$. $Re(\lambda)$ is measured by applying light having a wavelength of $\lambda$ nm to a sample such as a film in the normal direction thereof, using KOBRA 21ADH or WR (by Oji Scientific Instruments).

When a sample to be analyze by a monoaxial or biaxial index ellipsoid, $Rth(\lambda)$ of the film is calculated as follows.

$Rth(\lambda)$ is calculated by KOBRA 21ADH or WR based on six $Re(\lambda)$ values which are measured for incoming light of a wavelength $\lambda$ nm in six directions which are decided by a 10° step rotation from 0° to 50° with respect to the normal direction of a sample film using an in-plane slow axis, which is decided by KOBRA 21ADH, as an tilt axis (a rotation axis; defined in an arbitrary in-plane direction if the film has no slow axis in plane); a value of hypothetical mean refractive index; and a value entered as a thickness value of the film.

In the above, when the film to be analyzed has a direction in which the retardation value is zero at a certain tilt angle, around the in-plane slow axis from the normal direction as the rotation axis, then the retardation value at the tilt angle larger than the tilt angle to give a zero retardation is changed to negative data, and then the $Rth(\lambda)$ of the film is calculated by KOBRA 21ADH or WR.

Around the slow axis as the tilt angle (rotation angle) of the film (when the film does not have a slow axis, then its rotation axis may be in any in-plane direction of the film), the retardation values are measured in any desired tilted two directions, and based on the data, and the estimated value of the mean refractive index and the inputted film thickness value, Rth may be calculated according to the following formulae (X) and (XI):

$$Re(\theta) = \left[ nx - \frac{ny \times nz}{\sqrt{\left\{ ny \sin\left(\sin^{-1}\left(\frac{\sin(-\theta)}{nx}\right)\right)\right\}^2 + \left\{ nz \cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}} \quad (X)$$

$$Rth = \left[ \frac{nx + ny}{2} - nz \right] \times d \quad (XI)$$

wherein $Re(\theta)$ represents a retardation value in the direction tilted by an angle $\theta$ from the normal direction; nx represents a refractive index in the in-plane slow axis direction; ny represents a refractive index in the in-plane direction perpendicular to nx; and nz represents a refractive index in the direction perpendicular to nx and ny. And "d" is a thickness of the sample.

When the sample such as a film to be analyzed is not expressed by a monoaxial or biaxial index ellipsoid, or that is, when the film does not have an optical axis, then $Rth(\lambda)$ of the film may be calculated as follows:

$Re(\lambda)$ of the film is measured around the slow axis (judged by KOBRA 21ADH or WR) as the in-plane tilt axis (rotation axis), relative to the normal direction of the film from −50 degrees up to +50 degrees at intervals of 10 degrees, in 11 points in all with a light having a wavelength of $\lambda$ nm applied in the tilted direction; and based on the thus-measured retardation values, the estimated value of the mean refractive index and the inputted film thickness value, Rth(λ) of the film may be calculated by KOBRA 21ADH or WR.

In the above-described measurement, the hypothetical value of mean refractive index is available from values listed in catalogues of various optical films in Polymer Handbook (John Wiley & Sons, Inc.). Those having the mean refractive indices unknown can be measured using an Abbe refract meter. Mean refractive indices of some major optical films are listed below:

cellulose acylate (1.48), cycloolefin polymer (1.52), polycarbonate (1.59), polymethylmethacrylate (1.49) and polystyrene (1.59).

KOBRA 21ADH or WR calculates nx, ny and nz, upon enter of the hypothetical values of these mean refractive indices and the film thickness. Base on thus-calculated nx, ny and nz, $Nz=(nx-nz)/(nx-ny)$ is further calculated.

In this description, the "slow axis" of the retardation film and others means the direction in which the refractive index is the largest. The "visible light region" is from 380 nm to 780 nm. Unless otherwise specifically indicated the refractive index is one measured at λ=550 nm in the visible region.

In this description, it should be so interpreted that the numerical data, the numerical range and the qualitative expression (for example, expression of "equivalent", "equal" or the like) indicating the optical properties of the constitutive members such as the retardation region, the retardation film, the liquid-crystal layer and others shall be the numerical data, the numerical range and the qualitative properties including generally acceptable errors regarding the liquid-crystal display device and the constitutive members thereof.

In this description, the retardation film means a self-supporting film disposed between a liquid-crystal cell and a polarizing element (irrespective of the level of retardation). The retardation film is synonymous with a retardation layer. The retardation region is a generic term for one or more layers of a retardation film disposed between a liquid-crystal cell and a polarizing element.

In this description, "front side" means the display panel side; and "rear side" means the backlight side. In this description, "front" means the normal direction relative to the display panel; and "front contrast ratio (CR)" means the contrast ratio computed from the white brightness and the black brightness measured in the normal direction to the display panel.

The invention relates to a VA-mode liquid-crystal display device in which the VA-mode liquid-crystal cell is directly stuck to the rear-side polarizing element. Heretofore, as the backlight to be disposed on the rear side as the light source for a liquid-crystal display device, a backlight capable of emitting oriented light is used. The light from the backlight to a liquid-crystal display device in an oblique direction is scattered through the liquid-crystal layer in the liquid-crystal cell and the color filter, and the light component scattered in the front direction is one factor of reducing the front CR. As a result of investigations, the present inventor has known that, in case where the light from a backlight to a rear-side polarizing element passes through a retardation region before it comes in a liquid-crystal cell, the reduction in the front CR is remarkable. The reasons are as follows:

(i) In case where the linear polarized light from a backlight having run through a rear-side polarizing element in an oblique direction passes through a retardation region before it enters a liquid-crystal cell, the light is elliptically polarized owing to Re and/or Rth in the retardation region and, after that, the light is scattered to the front through the liquid-crystal layer in the liquid-crystal cell and a color filter layer or the like. Of the light scattered on the front, the component in the absorption axis direction of the front-side polarizing element (hereinafter this may be referred to as "component A") is absorbed by the polarizing element, but the component in the transmission axis direction of the front-side polarizing element (hereinafter this may be referred to as "component B") runs through the polarizing element. The component B is the cause of reduction in the front CR. When the component B is reduced, then the front contrast ratio may be enhanced. From this viewpoint, Rth in the retardation region positioned between the rear-side polarizing element and the liquid-crystal cell is preferably as small as possible.

(ii) The retardation film to constitute a retardation region has an optical axis distribution owing to its production, and this causes axial deviation in sticking the film to a polarizing element. The axial deviation promotes the elliptical polarization of the light from a backlight; and therefore, when the axial deviation is reduced, then the front contrast ratio can be enhanced. From this viewpoint, Re of the retardation film to constitute the retardation region positioned between the rear-side polarizing element and the liquid-crystal cell is preferably as small as possible.

Based on the above findings (i) and (ii), the inventor has further investigated and, as a result, has found that, when any member having retardation is not present between the rear-side polarizing element and the liquid-crystal cell and when the rear-side polarizing element is directly stuck to the liquid-crystal cell, then a VA-mode liquid-crystal display device having a high front CR can be obtained.

In this description, the state where the polarizing element is "directly stuck" to the VA-mode liquid-crystal cell includes not only the embodiment where the polarizing element and the VA-mode liquid-crystal cell are kept in contact with each other but also the embodiment where they are stuck to each other via a layer for sticking them, such as an adhesive layer, an easy-adhesion layer or the like disposed therebetween. However, the embodiment where a self-supporting member such as a retardation film or the like is disposed between the polarizing element and the VA-mode liquid-crystal cell is outside the scope of the invention.

In addition to the above-mentioned, front CR-increasing effect, the absence of a retardation member between the rear-side polarizing element and the liquid-crystal cell in the invention brings about another advantage of reducing circular unevenness. "Circular unevenness" means a phenomenon of circular light leakage appearing on the liquid-crystal panel when the panel is exposed to a high-temperature/high-humidity atmosphere and kept in black level of display. Its details are described in JP-A 2007-187841. One reason for this is because, when the liquid-crystal display device is exposed to a high-temperature/high-humidity atmosphere, then the backlight-side liquid-crystal cell substrate (concretely, the rear-side substrate 22 in FIG. 1) is deformed. In the invention, no retardation member exists between the rear-side polarizing element and the rear-side liquid-crystal cell substrate, and therefore, even though the rear-side cell substrate is deformed, circular unevenness hardly occurs and could be reduced.

In one embodiment of the invention where a retardation region exhibiting predetermined optical characteristics is disposed between the front-side polarizing element and the liquid-crystal cell, there is provided a liquid-crystal display device having excellent viewing angle characteristics of increased CR in oblique directions and reduced color shift in oblique directions at the time of black level of display.

FIG. 1 shows a schematic cross-sectional view of one example of the VA-mode liquid-crystal display device of the invention. In the drawing, the relative relationship in the thickness between the constitutive layers does not always correspond to the relative relationship in the thickness between the constitutive layers of an actual liquid-crystal display device.

The VA-mode liquid-crystal display device shown in FIG. 1 comprises a VA-mode liquid-crystal cell LC, and a front-side polarizer PL on the front-side surface thereof. On the other hand, the device does not have a rear-side polarizer as an independent member, and in the device, the rear-side polarizing element 12 is directly stuck to the surface of the VA-mode liquid-crystal cell LC. A backlight 10 is disposed on the outer surface of the rear-side polarizing element 12 and is so designed that the light from the backlight 10 runs through the rear-side polarizing element 12, the liquid-crystal cell LC and the front-side polarizer PL in that order. The liquid-crystal cell LC is a VA-mode liquid-crystal cell, and at the time of black level of display, the liquid-crystal molecules therein are homeotropically aligned. The liquid-crystal cell LC comprises an upper substrate 24 and a lower substrate 22 of glass or the like facing each other, in which an alignment layer (not shown) and an electrode layer (not shown) are formed on each substrate, and a color filter layer (not shown) is formed on the front-side substrate.

As in FIG. 1, in the invention, the rear-side polarizing element (12 in FIG. 1) is directly stuck to the surface of the VA-mode liquid-crystal cell (LC in FIG. 1), thereby providing the effect of improving the front CR. As a result of further assiduous investigations, the present inventor has found that the front CR-increasing effect, which is given by the direct sticking of the rear-side polarizing element to the VA-mode liquid-crystal cell and by the absence of any retardation member therebetween, is especially remarkable in an embodiment where the member-contrast ratio ($CR_f$) of the front-side substrate members of the VA-mode liquid-crystal cell (including the substrate 24 and all the members disposed on the substrate 24 in FIG. 1) is higher than the member-contrast ratio ($CR_r$) of the rear-side substrate members (including the substrate 22 and all the members disposed on the substrate 22 in FIG. 1). Concretely, in an embodiment where the ratio of the member-contrast ratio ($CR_f$) of the front-side substrate to the member-contrast ratio ($CR_r$) of the rear-side substrate, $CR_f/CR_r$ is equal to or more than 3, or that is, $3 \leq CR_f/CR_r$, the effect of the invention is remarkable. In practical use, the uppermost limit of $CR_f/CR_r$ is considered to be 1000 or so.

In this, when the VA-mode liquid-crystal cell (LC in FIG. 1) is separated into two substrates (substrates 22 and 24 in FIG. 1), the front-side substrate (substrate 24 in FIG. 1) and the members disposed on the substrate are generically referred to as the front-side substrate; and the rear-side substrate (substrate 22 in FIG. 1) and the members disposed on the substrate are generically referred to as the rear-side substrate. Examples of the members include color filter, black matrix, array member (TFT array, etc.), projections on the substrate, common electrode, slits, etc. Specifically, the member-contrast ratio of the rear-side substrate of a liquid-crystal cell and that of the front-side substrate thereof each means the total contrast ratio of the substrate and the members disposed on the substrate. The details for the method of measurement are described in the section of Examples given hereinunder.

As described in the above, the present inventor has found that the retardation of the member existing between the rear-side polarizing element and the liquid-crystal cell have a significant influence on the front CR of a liquid-crystal display device. The reason for this is because various optical phenomena such as scattering or diffraction occur in the constitutive members of the liquid-crystal cell (for example, liquid-crystal layer, color filter, black matrix, array member, projections formed on the substrate, common electrode member, slit member, etc.), and the optical phenomena have polarization dependence. This is described in detail hereunder.

In general, in a VA-mode liquid-crystal display device, the liquid-crystal layer is in a vertically-aligned state at the time of black level of display; and in that state, the linear polarized light passing through the rear-side polarizing element and running in the normal direction does not change its polarization state even after having passed through the liquid-crystal layer, and in principle, this is all absorbed at the absorption axis of the front-side polarizing element. Specifically, in principle, at the time of black level of display, it may be said that there is no light leakage in the normal direction at the time of black level of display. However, the front transmittance at the time of black level of display of the VA-mode liquid-crystal display device is not zero. It is known that one reason is because the liquid-crystal molecules in the liquid-crystal layer fluctuate, and the light having come into the liquid-crystal layer is scattered in some degree by the fluctuation. When the light having come into the liquid-crystal layer contains completely only the linear polarized component to be absorbed at the absorption axis of the front-side polarizing element, the influence may be greater and the light leakage on the front tends to increase. Specifically, when the retardation in the retardation region between the rear side and the polarizing element is larger and when the incident light is elliptically polarized at a higher elliptical polarization degree, then the light leakage on the front owing to the fluctuation can be reduced more.

However, as a result of assiduous investigations, the present inventor has known that, except the fluctuation of the liquid-crystal molecules in the liquid-crystal layer, the retardation in the retardation region between the rear-side polarizing element and the liquid-crystal layer also contributes to the reason for light leakage. When the oriented light from the backlight has passed through the rear-side polarizing element and comes in the retardation region in an oblique direction, the linear polarized light is converted into elliptical polarized light owing to the retardation. The elliptically-polarized light is diffracted and scattered in the array member of the liquid-crystal cell and in the color filter layer, and at least a part of the light comes to run in the front direction. The elliptically polarized light includes a linear polarized light component that could not be blocked at the absorption axis of the front-side polarizing element, and therefore, even at the time of black level of display, there occurs light leakage in the front direction, therefore causing a reason for front CR reduction. The optical phenomenon to occur through the array member and the color filter layer is, for example, because the surface of the array member and the color filter layer is not completely smooth but is roughened in some degree and because the member may contain some scattering factors, etc. The influence of the optical phenomenon to occur through the array member and the color filter layer on the light leakage in the front direction is greater than the influence thereon of the fluctuation of the liquid-crystal molecules in the liquid-crystal layer mentioned above.

As a result of further investigations, the present inventor has known that the optical phenomena (diffraction, scattering, etc.) to occur when the light elliptically polarized through the retardation region passes through the member disposed in the liquid-crystal cell bring about different influence modes on the light leakage in the front direction depending on as to whether the light passes through the member before coming into the liquid crystal layer or the light passes through the member after having passed through the liquid-crystal layer. In FIG. 1, for example, when an array member is disposed on the inner face of the rear-side substrate and a color filter is disposed on the inner face of the front-side substrate as in FIG. 2(a), the incident light passes through the array member before coming into the liquid-crystal layer, and after having passed through the liquid-crystal layer, it runs through the color filter.

In the member through which the incident light passes before coming into the liquid-crystal layer (e.g., array member), the degree of elliptical polarization of the incident light is determined by the retardation in the retardation region between the rear-side polarizing element and the liquid-crystal cell through which the light passes beforehand. On the other hand, in the member through which the incident light passes after having passed through the liquid-crystal layer (e.g., color filter), the degree of elliptical polarization of the incident light is determined by the retardation of the liquid-crystal layer in addition to the retardation in the retardation region between the rear-side polarizing element and the liquid-crystal cell. In the case of a VA-mode liquid-crystal display device, in general, $\Delta nd(590)$ of the liquid-crystal layer is defined to be from 280 to 350 nm or so; and "d" means the thickness of the liquid-crystal layer (nm); $\Delta n(\lambda)$ means the refractivity anisotropy at a wavelength $\lambda$ of the liquid-crystal layer; and $\Delta nd(\lambda)$ is the product of $\Delta n(\lambda)$ and d. Even though the retardation in the retardation region between the rear-side polarizing element and the liquid-crystal cell is so defined that the light leakage through the array member is reduced, the degree of elliptical polarization rather increases contrary to this, after the incident light has passed through the liquid crystal. When the retardation in the retardation region between the rear-side polarizing element and the liquid-crystal cell is larger, then the degree of elliptical polarization of the incident light is smaller, and therefore, when the retardation in the retardation region between the rear-side polarizing element and the liquid-crystal cell is set low, depending on the member through which the incident light passes before passing through the liquid-crystal layer or on the member through which the incident light passes after having passed through the liquid-crystal layer, the effect for the influence of the member on the light leakage in the front direction is turned back.

The level of the retardation of the member disposed between the rear-side polarizing element and the liquid-crystal cell, the tendency of the influence of each member, through which the incident light passes, on the light leakage in the front direction, and the level of the influence are shown in FIG. 2(b). In FIG. 2(b), "↑" means the effect of elevating the front CR as compared with the case where the rear-side retardation region has high retardation, and "↓" means the effect of decreasing the front CR. The number of the arrows is a criterion of the level of the effect; and the larger number indicates a higher effect.

As in FIG. 2(b), in the embodiment of a VA-mode liquid-crystal display device where a color filter is disposed on the front-side substrate and an array member is on the rear-side substrate, when the retardation in the retardation region between the rear-side polarizing element and the liquid-crystal cell is lowered, then the effect is toward the direction of reducing the light leakage in the front direction to be caused by the optical phenomenon by the array member disposed on the rear-side substrate, while on the other hand, the effect is toward the direction of increasing the light leakage in the front direction to be caused by the optical phenomenon by the color filter layer disposed on the front-side substrate, or that is, the two effects are in a relation of being canceled out each other.

For example, in a liquid-crystal cell where a member to be a factor of lowering the contrast ratio is disposed similarly on both the rear-side substrate and the front-side substrate, even though a retardation member such as a retardation film or the like is not disposed between the rear-side polarizing element and the liquid-crystal cell to thereby reduce the influence of retardation, the effect of elevating the front CR by the member disposed on the rear-side substrate (for example, in FIG. 2(b), the array member) may be somewhat canceled by the effect of reducing the front CR by the member disposed on the front-side substrate (for example, in FIG. 2(b), the CF member), as the case may be. Specifically, it may be said that the characteristic of the present invention that the rear-side polarizing element is directly stuck to the liquid-crystal cell and any member having a retardation is not disposed therebetween exhibits an especially high effect in an embodiment where a lot of members to be factors of reducing the contrast ratio are disposed on the rear-side substrate.

The influence of the retardation in the retardation region between the rear-side polarizing element and the liquid-crystal cell on the front CR is almost negligible in liquid-crystal display devices having a low front CR. However, in liquid-crystal display devices having a high front CR (for example, having a front CR of at least 1500) provided these days, the influence is not negligible for the purpose of further elevating the front CR. The invention is especially effective for further elevating the front CR of liquid-crystal display devices having a front CR of at least 1500.

Figure 2:
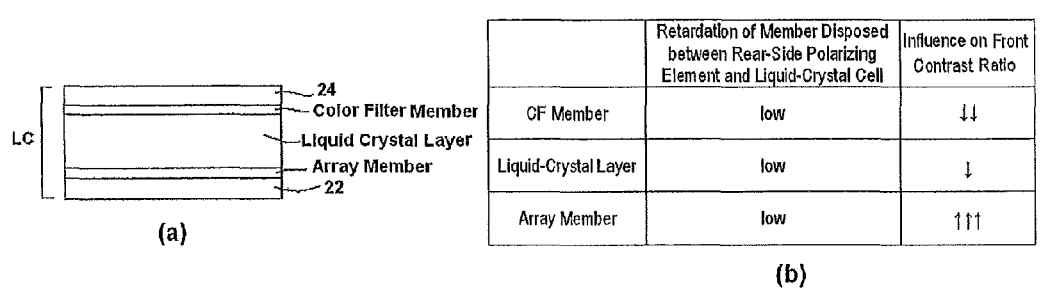
FIG. 2 is a schematic view used for explaining the effect of the invention.

In FIG. 2 showing one example of an ordinary liquid-crystal cell structure, a color filter (CF) is formed on the inner face of the front-side substrate 24 and an array member is on the inner face of the rear-side substrate. Apart from the ordinary liquid-crystal structure illustrated, CF and the array member may be positioned in any desired sites in the liquid-crystal display device of the invention. For example, needless-to-say, an embodiment where CF is disposed on the rear-side substrate having an array member thereon, like a color filter-on-array (COA) structure, falls in the scope of the invention. In case where the array member is disposed on the front-side substrate 24, the action of the array member may be the same as that of the CF member in FIG. 2(b); and in case where CF is disposed on the rear-side substrate 22, the action of the CF member may be the same as that of the array member in FIG. 2(b). The same shall apply to the other members not shown (for example, black matrix); and when the array member is disposed on the front-side substrate 24, then the action of the member may be the same as that of the CF member in FIG. 2(b), and when the member is disposed on the rear-side substrate 22, then the action of the member may be the same as that of the array member in FIG. 2(b).

As described in the above, the inventor has found that in the embodiment where the ratio of the member-contrast ratio of the front-side substrate (substrate 24 in FIG. 1) $CR_f$ to the member-contrast ratio of the rear-side substrate (substrate 22 in FIG. 1) $CR_r$, $CR_f/CR_r$ is equal to or more than 3, or that is $3 \leq CR_f/CR_r$, the advantage of the invention is more remarkable. One example of the liquid-crystal cell satisfying the relationship is, for example, a liquid-crystal cell in which the rear-side substrate is a COA substrate. COA is described in detail in JP-A 2005-99499 and 2005-258004.

In the COA substrate, color filter layers are laminated, and therefore the COA substrate could hardly deform by warping under heat or the like, as compared with an ordinary rear-side substrate (mainly an array member is disposed thereon). Accordingly, use of the COA substrate as the rear-side substrate in the invention further enhances the above-mentioned, circular unevenness-reducing effect.

As described in the above, the incident light polarization dependence of the light leakage at the time of black level of display owing to the optical phenomena in CF, black matrix and array member is all in the same tendency; however, the contribution of black matrix is relatively small, and therefore the position of the black matrix in the liquid-crystal display device with COA where CF is disposed on the rear-side substrate having an array member thereon may be in any site inside the liquid-crystal cell, and preferably, the black matrix is positioned between the rear-side polarizing element and the liquid-crystal layer.

Other examples of the liquid-crystal cell satisfying $3 \leq CR_f/CR_r$ include a liquid-crystal cell not having a color filter, and a liquid-crystal cell not having a color filter but driven in a field-sequential display mode. The field-sequential mode liquid-crystal cell is described in detail in JP-A 2009-42446, 2007-322988, and Japanese Patent 3996178, which are incorporated herein by reference. In the field-sequential display mode, used are independent backlight units that sequentially emit lights of three primary colors. Preferred are backlight units each provided with LED as the light source; and for example, preferably used are backlight units each provided with an LED element emitting any of three colors of red, green and blue.

Even an ordinary liquid-crystal cell where an array member is disposed on the rear-side substrate and a color filter is on the front-side substrate can be a preferred embodiment of the invention needless-to-say satisfying the above-mentioned condition, $3 \leq CR_f/CR_r$, so far as the color filter therein has a high contrast ratio. One example of the color filter having a high contrast ratio is a color filter containing a pigment having a smaller particle size than that of the pigment to be in ordinary CF. The following two methods may be mentioned as an example of producing a high-contrast ratio color filter with a pigment.

(i) A method of mechanically more finely grinding pigment particles by the use of a disperser such as a sand mill, a roll mill, a ball mill or the like, which is described, for example, in JP-A 2009-144126 and this may be incorporated herein by reference.

(ii) A method of dissolving a pigment in a solvent followed by reprecipitating it to prepare fine pigment particles, which is described, for example, in JP-A 2009-134178.

Except pigment, a method of producing a high-contrast ratio color filter with dye is proposed. It is described in detail in JP-A 2005-173532, which may be incorporated herein by reference.

Use of the color filter described in these patent publications may make an ordinary liquid-crystal cell satisfy $3 \leq CR_f/CR_r$.

Again FIG. 1 is referred to. Preferably, the optical properties of the retardation film 16 which the front-side polarizer PL has can contribute toward elevating the contrast ratio in oblique directions and reducing the color shift at the time of black level of display. The preferred range of the retardation, especially Rth($\lambda$) of the retardation film disposed on the front side varies depending on the value of $\Delta nd(\lambda)$ of the liquid-crystal layer. The preferred range of the retardation film relative to $\Delta nd(\lambda)$ for elevating the oblique contrast ratio is described in various patent publications, for example, in Japanese Patents 3282986, 3666666 and 3556159, which may be incorporated herein by reference.

Preferred ranges of the optical properties of the retardation region are described hereinunder.

In the invention, a retardation film is not disposed on the rear side, and therefore a retardation film having a high retardation must be disposed on the front side for viewing angle compensation. As described in the above, in the system for optical compensation in a VA-mode liquid-crystal display device where either one side is made to shear a larger retardation, the film having a larger retardation is, in general, heretofore disposed on the rear side of the device; however, as in the present invention, it is considered that arranging the film having a higher retardation on the front side could enhance the yield ratio of the polarizer. The reason is described below.

The film having a large retardation requires a step of adding many additives thereto in production or a step of stretching it at a high ratio; and therefore, as compared with inexpensive films capable of being produced with no necessity of many additives thereto (e.g., plane TAC, triacetyl cellulose film having Re(550) of from 0 to 10 nm and Rth(550) of from 30 to 80 nm) and films having a small retardation, the high-retardation film could hardly be broadened to have a large width. In ordinary liquid-crystal display devices, a landscape-oriented liquid-crystal cell is used, and in general, the absorption axis of the front-side polarizing element is disposed in the horizontal direction (right-left direction) while the absorption axis of the rear-side polarizing element is in the perpendicular direction (vertical direction). In industrial-scale production, in general, the polarizing element and the retardation film are stuck together in a roll-to-roll mode. Taking the matter into consideration that the polarizer produced according to the production method is stuck to the liquid-crystal cell, it is recommended to arrange a high-retardation film on the front side since the lateral direction of the polarizer can be used at a high efficiency, or that is, the yield ratio of the polarizer used can be increased.

$\Delta nd(550)$ of a VA-mode liquid-crystal cell is generally from 280 to 350 nm or so, and this is for increasing as much as possible the transmittance at the time of white level of display. On the other hand, when $\Delta nd(550)$ is less than 280 nm, the white brightness may decrease slightly along with the reduction in $\Delta nd(550)$, but since the cell thickness d is small, the liquid-crystal display device can be excellent in rapid responsibility.

The VA-mode liquid-crystal display device of the invention may have any type of VA-mode liquid-crystal cell mentioned above, and can exhibit its excellent effect irrespective of the value $\Delta nd(\lambda)$ of the VA-mode liquid-crystal cell therein.

In FIG. 1, the rear-side polarizing element 12 has the protective film 18 on the surface thereof facing the backlight 10, and may additionally have further thereon any functional film such as antifouling film, antireflection film, antiglare film, antistatic film, etc.; and similarly, the front-side polarizing element 14 has the protective film 20 on the surface thereof facing the panel side, and may additionally have further thereon any functional film such as antifouling film, antireflection film, antiglare film, antistatic film, etc. In the embodiment of the VA-mode liquid-crystal display device of FIG. 1, the retardation film 16 functions also as a protective film for the polarizing element 14; however, the invention should not be restricted to this embodiment. For example, an additional protective film for polarizing element may be separately disposed between the retardation film 16 and the polarizing element 14. However, as described in the above, the protective film to be disposed between the retardation film and the polarizing element must satisfy the requirement for the retardation region as a total of the laminate thereof with the retardation film.

The VA-mode liquid-crystal display device of the invention can be driven in any mode, concretely in any mode of MVA (Multi-Domain Vertical Alignment), PVA (Patterned Vertical Alignment), OP (Optical Alignment) or PSA (Polymer-Sustained Alignment). The details of these modes are described in JP-A 2006-215326, and JP-T 2008-538819.

As described in the above, a high-contrast ratio color filter may be used in the invention; however, needless-to-say, any ordinary color filter for ordinary liquid-crystal display devices may also be used. The color filter generally comprises a plurality of different colors (e.g., three primary colors, red, green and blue, and transparent, yellow, cyan, etc.) in the pixel sites of the substrate. Various methods for its production are known. For example, generally employed is a method of preparing a coloring photosensitive composition (including a colorless composition) referred to as a color resist using a coloring material (organic pigment, dye, carbon black, etc.), applying it onto a substrate to form a layer thereon, and patterning it through photolithography. Various methods are also known for applying the coloring photosensitive composition onto a substrate. For example, in early times, a spin coater method was employed; and from the viewpoint of saving the coating composition, a slit-and-spin coater method has become employed; and at present, a slit coater method is generally employed. In addition, also known are a roll coating method, a bar coating method, a die coating method, etc. Recently, another method has become employed, comprising patterning to form partitioning walls through photolithography followed by forming image colors according to an inkjet system. Apart from these, further known are a method of combining a coloring non-photosensitive composition and a photosensitive positive resist, a printing method, an electrodeposition method, and a film transfer method. The color filter for use in the invention may be produced in any method.

The material for forming the color filter is not also specifically defined. As the coloring material, usable is any of dye, organic pigment, inorganic pigment, etc. Use of dye has been investigated for satisfying the requirement for contrast ratio elevation; and recently, the technique of dispersing organic pigment has been promoted, and broken-down pigment prepared by finely breaking pigment in a salt-milling method, as well as fine pigment particles prepared by a built-up method have become used for contrast ratio elevation. In the invention, any coloring material may be used.

Various members usable in the invention are described below.

1. Retardation Region:

Preferably, the optical properties of the retardation region comprising one or more retardation layers to be disposed between the front-side polarizing element and the liquid-crystal cell are so controlled as to be able to contribute toward increase the contrast ratio in oblique directions and toward reduction in color shift at the time of black level of display. One preferred example of the retardation region satisfies 30 nm≦Re(550)≦90 nm, and 170 nm≦Rth(550)≦300 nm.

Falling within the range, the retardation region can reduce the light leakage through ordinary VA-mode liquid-crystal cells (with Δnd(550) of from 180 to 350 nm or so) in oblique directions at the time of black level of display.

Further, as described in the above, the preferred range of retardation, especially Rth(λ) in the retardation region disposed on the front side varies depending on the value of Δnd(λ) of the liquid-crystal layer. One example of a more preferred retardation region to be disposed on the front side at a wavelength λ, relative to Rth(λ) of the retardation region and Δnd(λ) of the liquid-crystal layer satisfies the following:

$$\Delta nd(550)-70 \leq Rth(550) \leq \Delta nd(550)-10,$$

more preferably, $$\Delta nd(550)-60 \leq Rth(550) \leq \Delta nd(550)-20.$$

Falling within the range, the retardation region can reduce the light leakage through VA-mode liquid-crystal cells in oblique directions at the time of black level of display.

For increasing the transmittance (or that is, for increasing the front CR) at the time of white level of display, preferably, Δnd(550) of the liquid-crystal layer is at least 280 nm. In this case, the front-side retardation region preferably satisfies the following:

$$220 \text{ nm} \leq Rth(550) \leq 300 \text{ nm},$$

more preferably, $$230 \text{ nm} \leq Rth(550) \leq 300 \text{ nm}.$$

On the other hand, in consideration of the production aptitude, a constitution of using a retardation film with Rth(550) ≦230 nm in the retardation region on the front side may be favorable in practical use. In general, for obtaining a retardation film having a high retardation, the film must be stretched at a high draw ratio or the amount to be added thereto of the additive contributing toward retardation expression must be increased; however, when the draw ratio in stretching is high, the film being stretched may be often broken or cut, and when the amount of the additive to be added is increased, then the additive may bleed out of the film.

In using the retardation film with Rth(550)≦230 nm, Δnd (550) of the liquid-crystal cell is preferably Δnd(550)≦290 nm, more preferably Δnd(550)≦280 nm.

Regarding the wavelength dispersion characteristics of the in-plane retardation Re in the retardation region, preferably, Re in the retardation region is larger at a longer wavelength in a visible light range, or that is, the retardation region preferably exhibits reversed wavelength dispersion characteristics of retardation. Specifically, the retardation region satisfies Re(450)<Re(550)<Re(630). The reason is because, in case where the retardation region exhibits reversed wavelength dispersion characteristics of Re, then the region could be optimized throughout the whole visible light region when the optical characteristics thereof are optimized at the center wavelength 550 nm or so in the visible light region.

For obtaining a higher front CR, the haze of the retardation film that constitutes the retardation region on the front side is preferably at most 0.5, more preferably at most 0.3, even more preferably at most 0.2.

In this description, the film haze may be determined according to the measurement method mentioned below. A film sample of 40 mm×80 mm is prepared, and in an environment at 25° C. and 60% RH, this is analyzed with a haze meter (NDH-2000, by Nippon Denshoku Industry) according to JIS K-6714.

The retardation region may be formed of a retardation film alone or formed of a lamination of two or more films. And the materials thereof are not limited as far as it satisfies the above-described properties. For example, one or two or polymers may be selected from the group consisting of a cellulose acylate, a polycarbonate-based polymer, a polyester-based polymer such as polyethylene terephthalate or polyethylene naphthalate, an acrylic-based polymer such as polymethylmethacrylate, or a styrene-based polymer such as polystyrene or an acrylonitrile-styrene copolymer (AS resin) may be used. Polyolefin such as polyethylene or polypropylene, a polyolefin-based polymer such as an ethylene-propylene copolymer, a vinyl chloride-based polymer, an amide-based polymer such as nylon or aromatic polyamide, an imido-based polymer, a sulfone-based polymer, a polyether sulfone-based polymer, polyetheretherketone-based polymer, a polyphenylensulfide-based polymer, a vinylidene chloride-based polymer, a vinyl alcohol-based polymer, a vinyl butyralbased polymer, an arylate-based polymer, a polyoxymethylene-based polymer, an epoxy-based polymer, and a polymer containing a mixture of the above polymers, and are used as a major ingredient for preparing the retardation film constituting the retardation region satisfying the above-described properties.

The retardation film constituting the retardation region is preferably a cellulose acylate-based film.

In the description, the term "cellulose acylate-based film" means a film containing any cellulose acylate(s) as a major ingredient (50 mass % or more with respect to the total mass of all ingredients). The cellulose acylate(s) which can be used for preparing the film is a compound in which hydrogen atom(s) of hydroxy group in the cellulose acylate is substituted with an acyl group. The cellulose acylate is a compound in which hydrogen atom(s) of hydroxy group in the cellulose acylate is substituted with an acyl group; and the acyl group having from 2 (acetyl) to 22 carbon atoms may be used as the substituent. Regarding the cellulose acylate which can be used in the invention, the substitution degree of hydroxy group in cellulose is especially not limited. The degree of substitution (degree of acylation) can be obtained by measuring the binding degree of acetic acid and/or $C_3$-$C_{22}$ aliphatic acid to hydroxy(s) in cellulose and then calculating the measured values(s). The measuring may be carried out according to D-817-91 of ASTM.

A material of cellulose acylate-based film which is used as a retardation film constituting the retardation region, preferably has the degree of acyl-substitution of from 2.00 to 3.00. The retardation of a film may be adjusted to a preferable value by being subjected to a stretching treatment. In terms of developing retardation via a stretching treatment, the degree of acyl-substitution is preferably low. However, an un-stretched film having a lower degree of acyl-substitution exhibits higher Rth; and as a retardation film to be used in a VA-mode liquid-crystal display device, the cellulose acylate preferably has the degree of acyl-substitution of from 2.00 to 2.65, more preferably from 2.20 to 2.65, and much more preferably from 2.30 to 2.60. On the other hand, in terms of preparing a reversed-wavelength dispersion film, the high acyl-substitution degree is preferable, and the acyl-substitution degree is preferably from 2.65 to 3.00, more preferably from 2.75 to 3.00, and much more preferably from 2.80 to 3.00.

The cellulose acylate is preferably cellulose acetate. However, the cellulose acylate may be substituted with an acyl other than acetyl together with acetyl or in place of acetyl. Cellulose acylates having at least one selected from the group consisting of acetyl, propionyl and butyryl are preferable; and cellulose acylates having at least two selected from the group consisting of acetyl, propionyl and butyryl are more preferable. Furthermore, cellulose acylates having the degree of acetyl-substitution of from 1.0 to 2.97 and the degree of propionyl- and/or butyryl-substitution of from 0.2 to 2.5 are more preferable.

The cellulose acylate has preferably mass average degree of polymerization of 200 to 800, and more preferably a mass average degree of polymerization of 250 to 550. The cellulose acylate used in the present invention has preferably an average molecular weight of 70000 to 230000, more preferably 75000 to 230000, and still more preferably 78000 to 120000.

For preparing the cellulose acylate-based film constituting the retardation region, retardation enhancer is preferably used as an additive. Examples of the retardation enhancer which can be used in the invention include rod-like or discotic compounds and positive-birefringence compounds. Examples of the rod-like or discotic compound include compounds having at least two aromatic rings, and are preferable used as a retardation enhancer. The amount of the rod-like compound is preferably from 0.1 to 30 parts by mass, and more preferably from 0.5 to 20 parts by mass with respect to 100 parts by mass of the polymer ingredients including cellulose acylate. The amount of the discotic compound is preferably from 0.05 to 20 parts by mass, more preferably from 0.1 to 15 parts by mass, and much more preferably from 0.1 to 10 parts by mass with respect to 100 parts by mass of the cellulose acylate.

The discotic compound is more excellent than the rod-like compound in terms of enhancing Rth retardation; and when especially high Rth retardation is required, the discotic compound is preferably used. Plural types of the compounds may be used as a retardation enhancer.

The retardation enhancer preferably has a maximum absorption within the wavelength range of from 250 to 400 nm, and preferably has no absorption within the visible-light substantially.

(1) Discotic Compound

The discotic compound is described in detail. As the discotic compound, compounds having at least two aromatic rings may be used. In the description, the term "aromatic ring" means not only an aromatic hydrocarbon ring but also an aromatic hetero ring. Examples of the discotic compound which can be used in the invention include those described in JP-A 2008-181105, [0038]-[0046].

Examples of the discotic compound which can be used as a material of the retardation film constituting the retardation region include the compounds represented by formula (1) below.

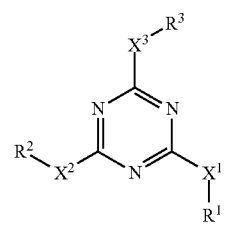

(I)

In the formula, $X^1$ represents a single bond, —$NR^4$—, —O— or —S—; $X^2$ represents a single bond, —$NR^5$—, —O— or —S—; $X^3$ represents a single bond, —$NR^6$—, —O— or —S—. And, $R^1$, $R^2$, and $R^3$ independently represent an alkyl group, an alkenyl group, an aromatic ring group or a hetero-ring residue; $R^4$, $R^5$ and $R^6$ independently represent a hydrogen atom, an alkyl group, an alkenyl group, an aryl group or a hetero-ring group.

Preferred examples, I-(1) to IV-(10), of the compound represented by formula (I) include, but are not limited to, those shown below.

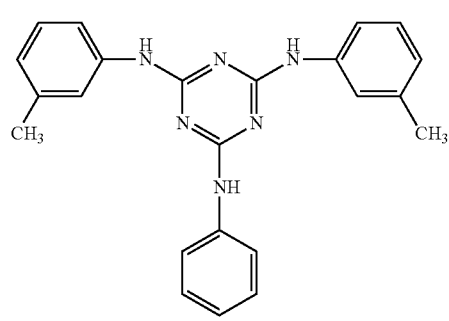

I-(1)

I-(2)
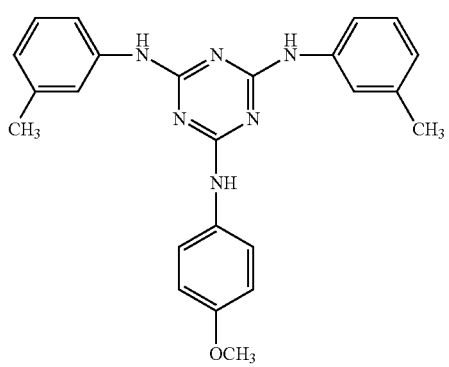
I-(3)
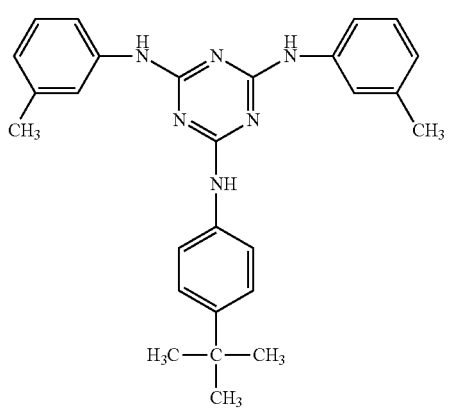
I-(4)
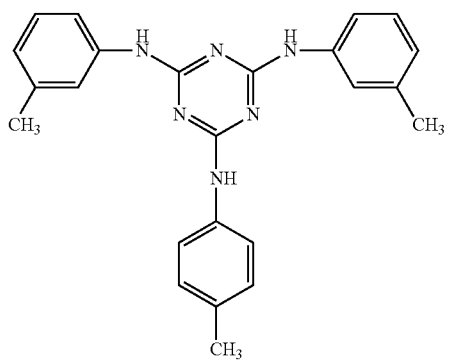
I-(5)
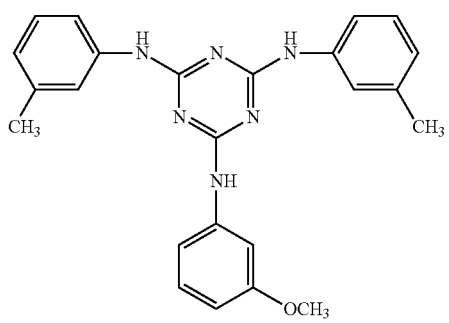
I-(6)
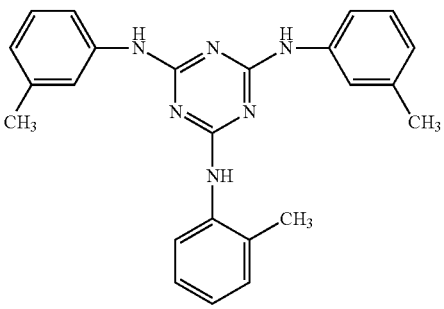
I-(7)
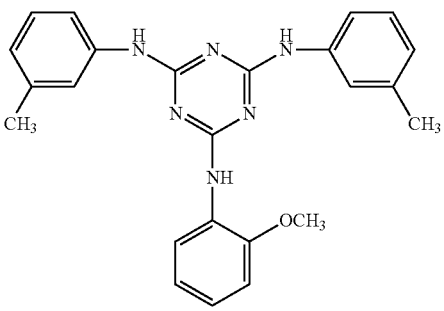
I-(8)
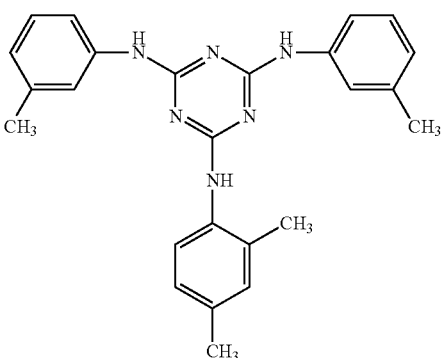
I-(9)
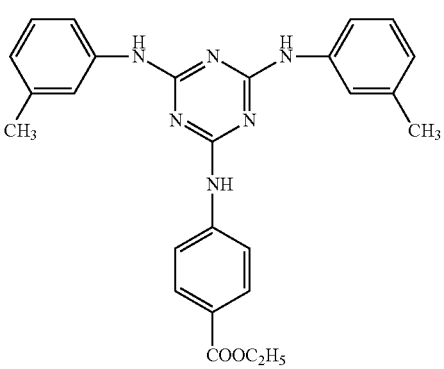
I-(10)
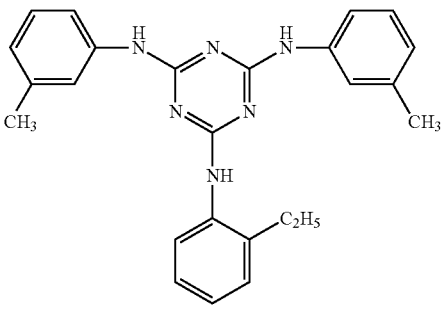

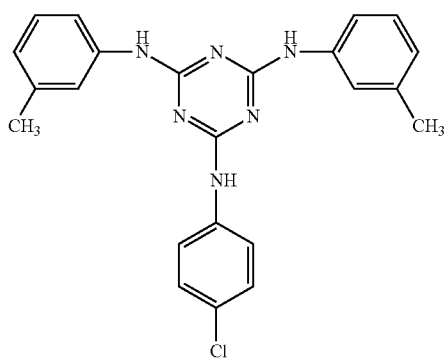
I-(11)
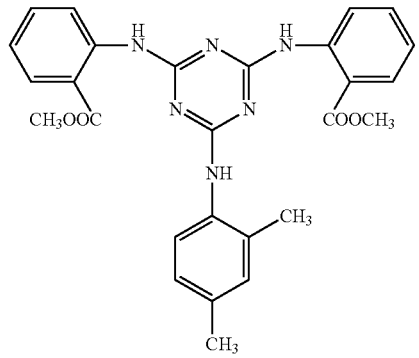
I-(16)
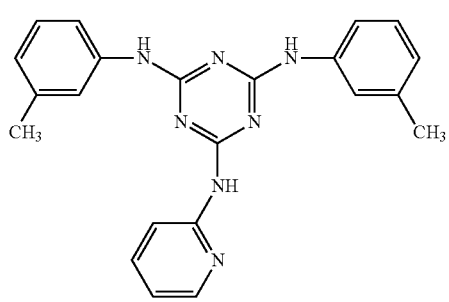
I-(12)
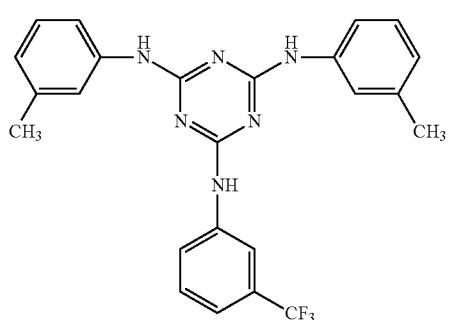
I-(17)
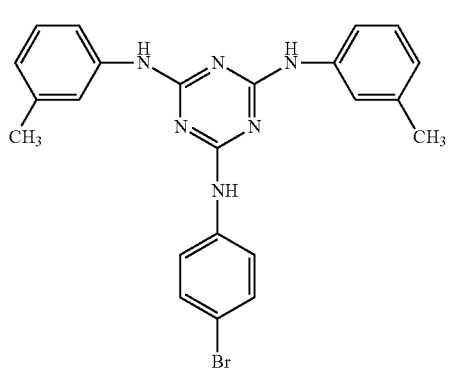
I-(13)
I-(18)
I-(14)
I-(19)
I-(15)
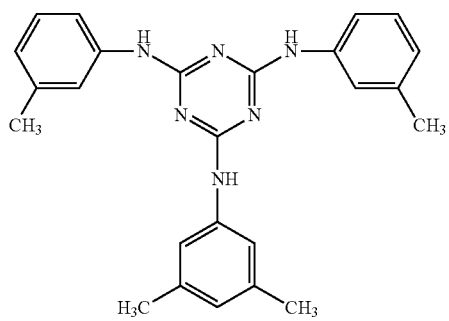
I-(20)

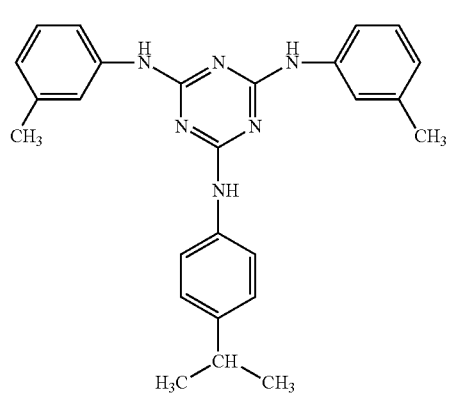
I-(21)
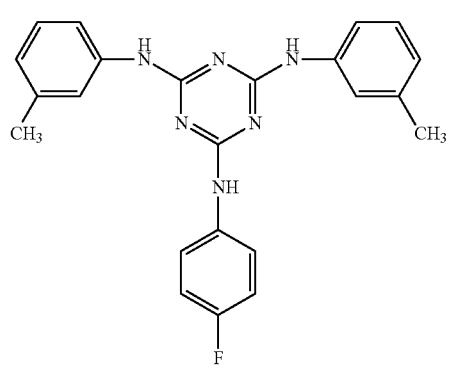
I-(22)
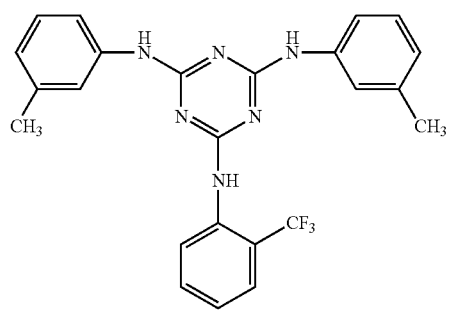
I-(23)
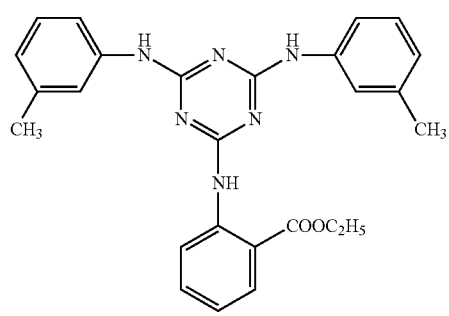
I-(24)
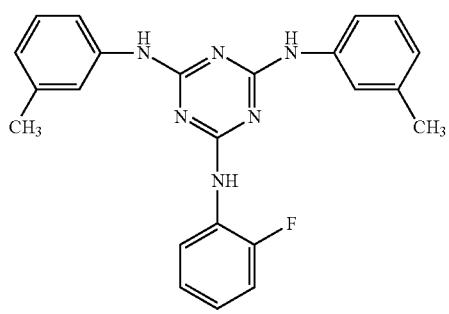
I-(25)
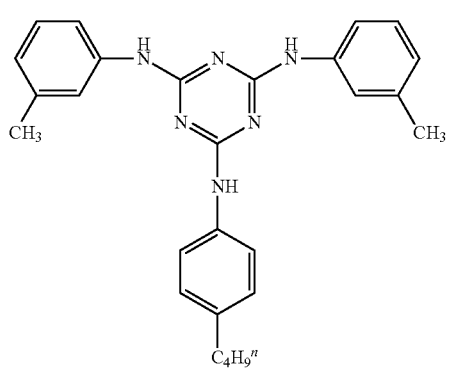
I-(26)
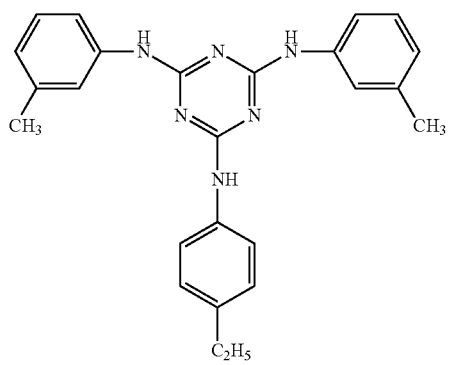
I-(27)
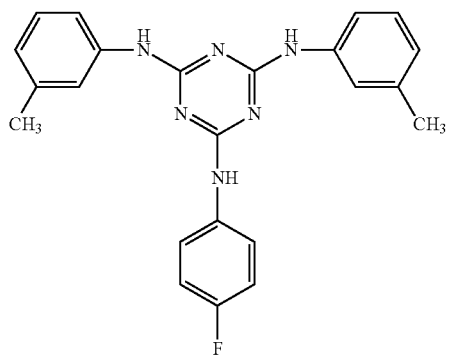
I-(28)

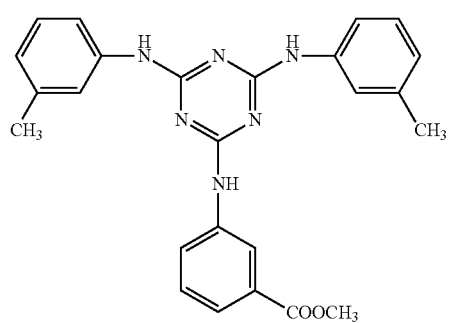
I-(29)
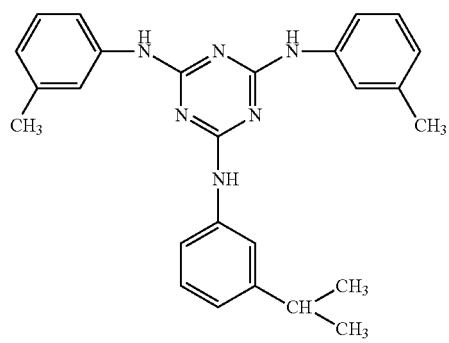
I-(30)
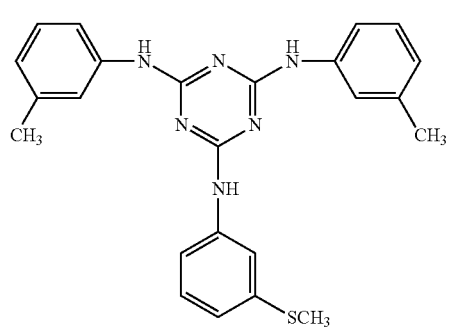
I-(31)
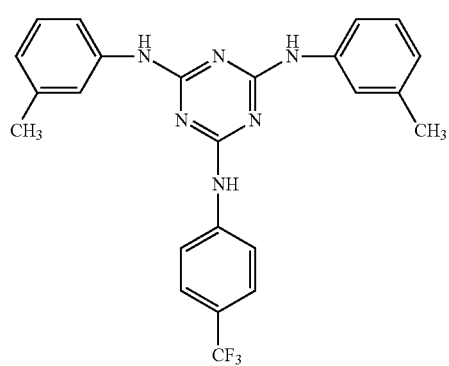
I-(32)
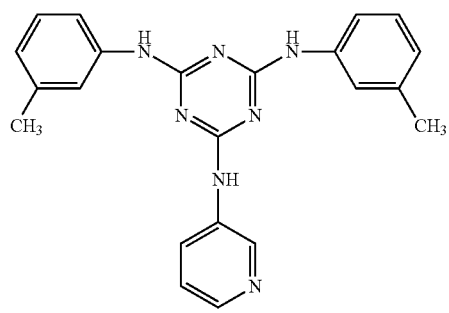
I-(33)
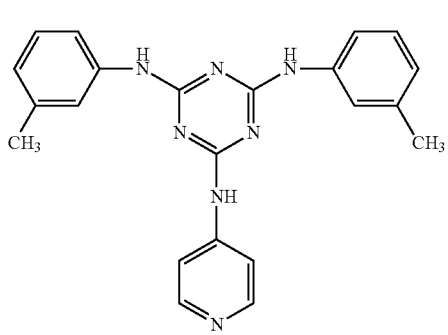
I-(34)
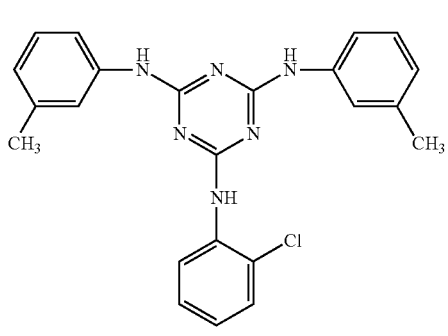
I-(35)
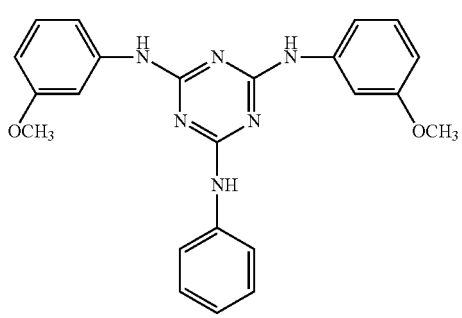
I-(36)
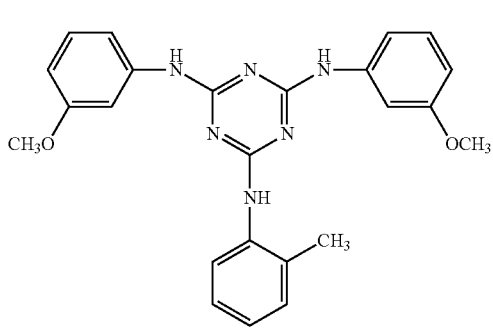
I-(37)
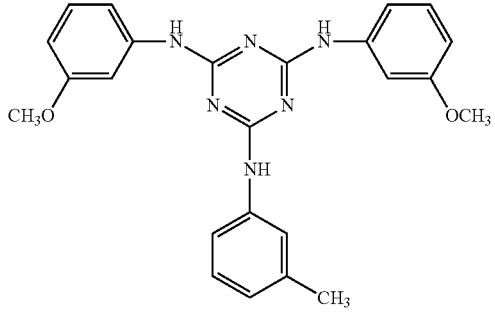
I-(38)

I-(39)
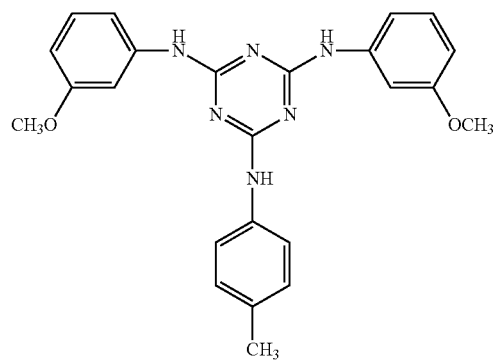
I-(40)
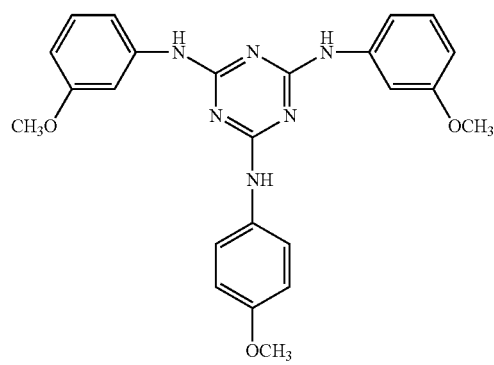
I-(41)
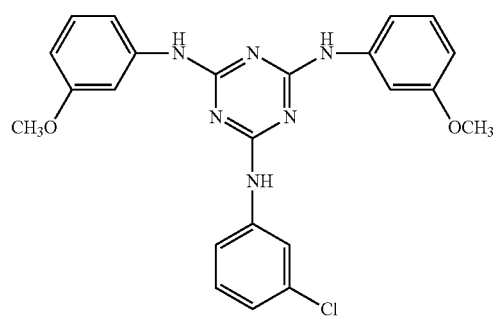
I-(42)
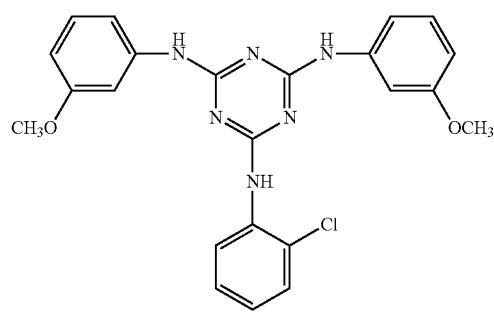
I-(43)
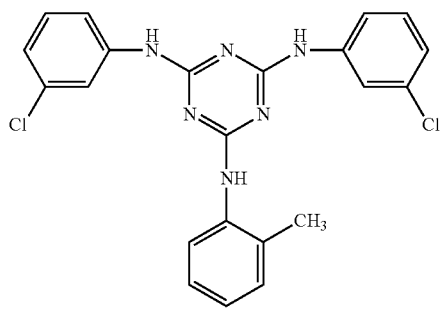
I-(44)
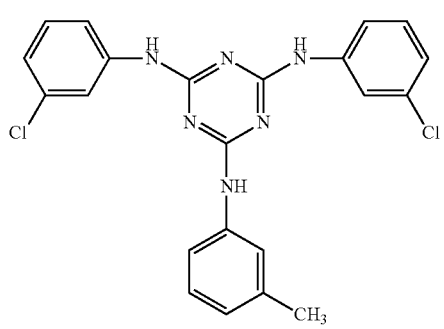
I-(45)
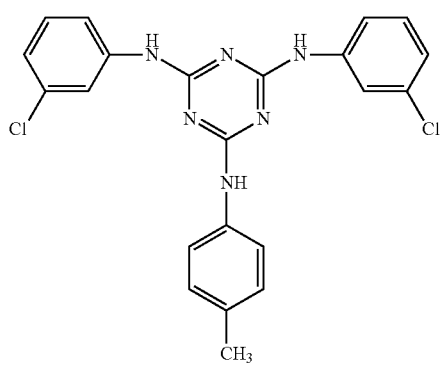
I-(46)
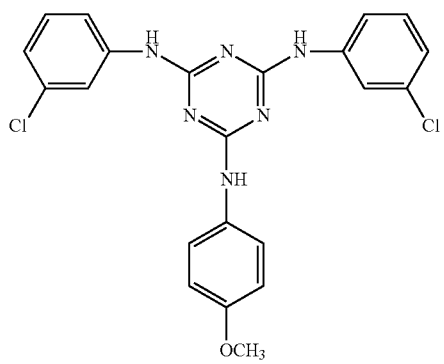

I-(47)
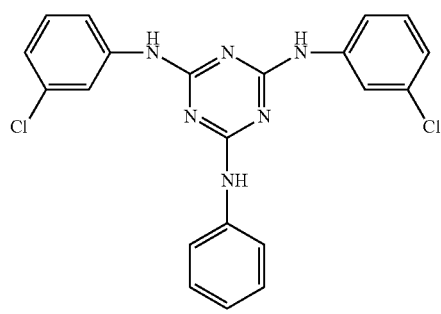
I-(48)
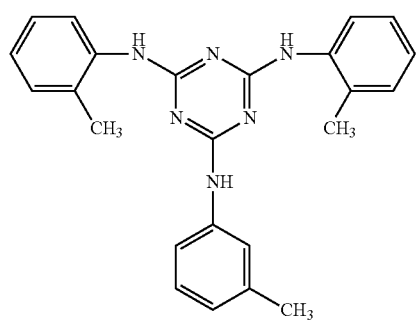
I-(49)
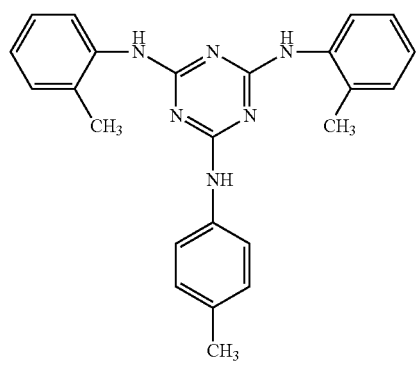
I-(50)
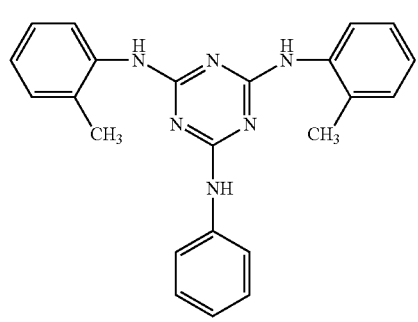
II-(1)
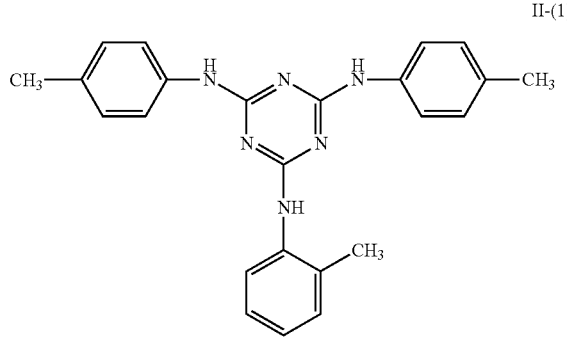
II-(2)
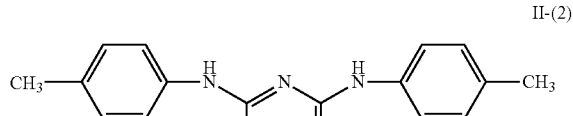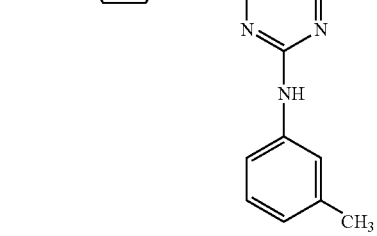
II-(3)
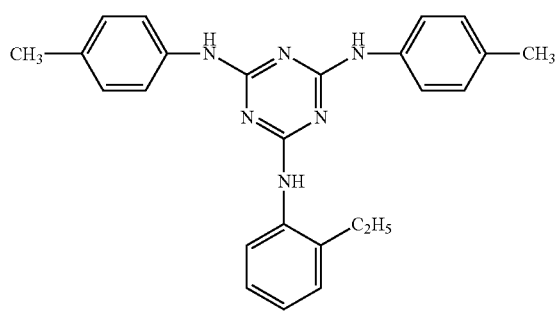
II-(4)
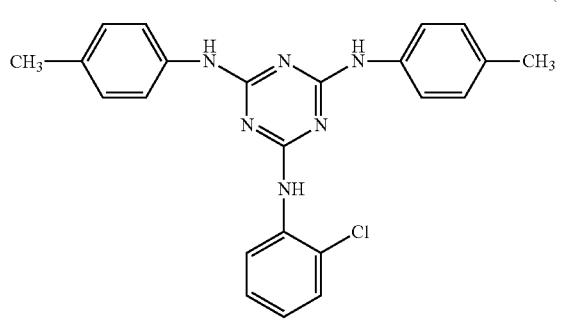
II-(5)
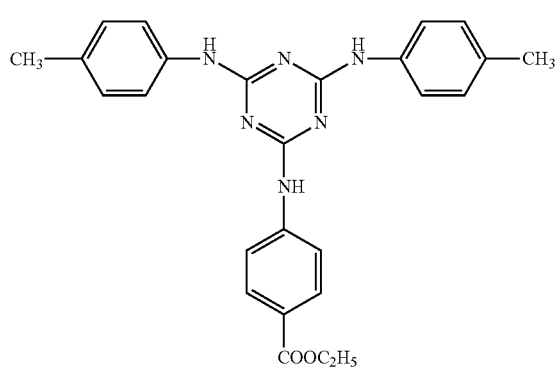

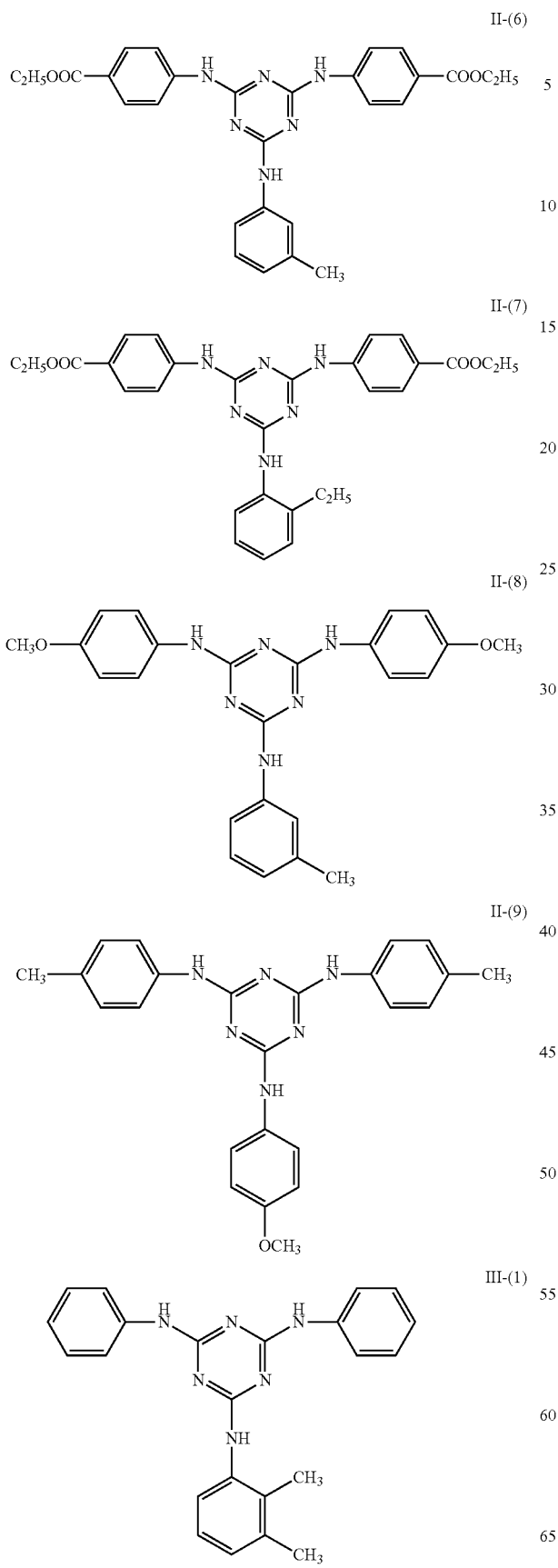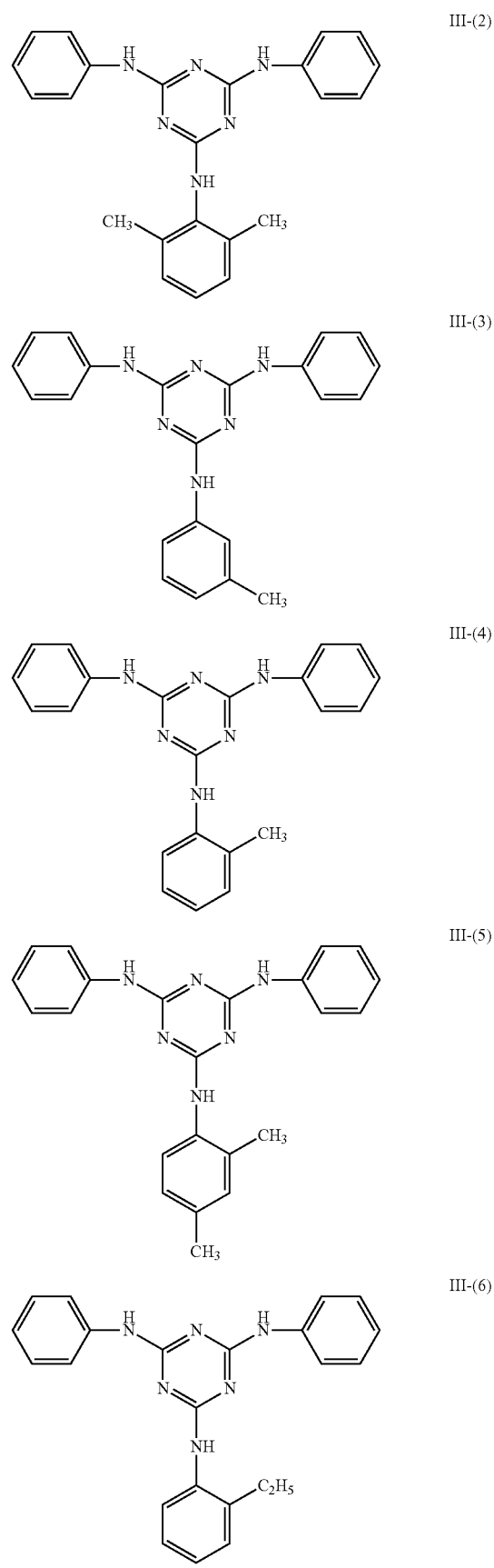

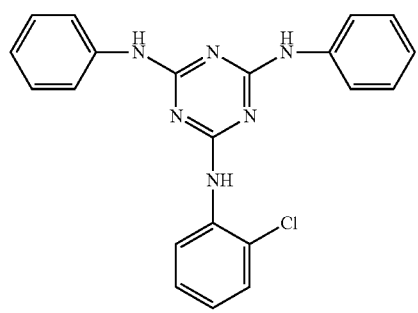
III-(7)
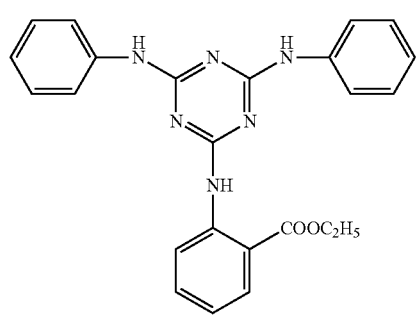
III-(8)
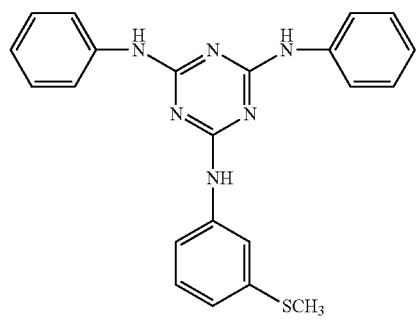
III-(9)
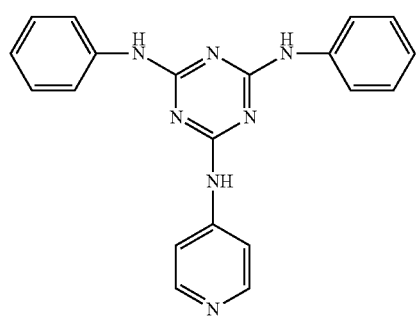
III-(10)
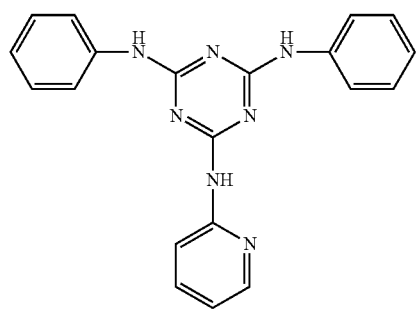
III-(11)
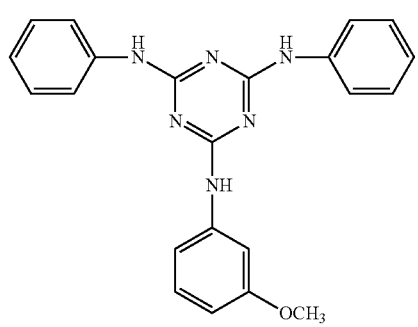
III-(12)
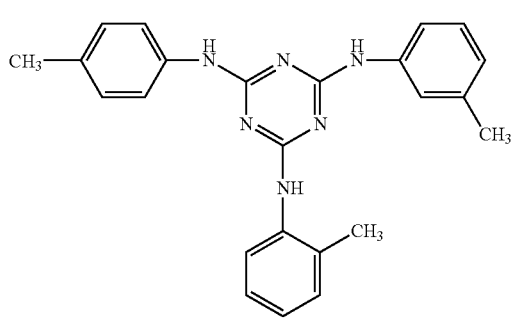
IV-(1)
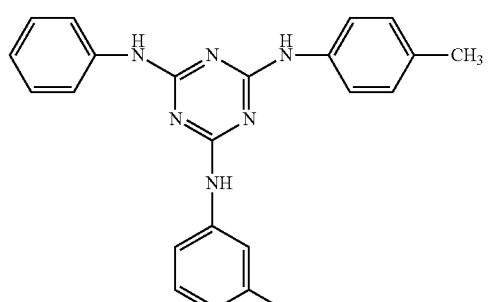
IV-(2)
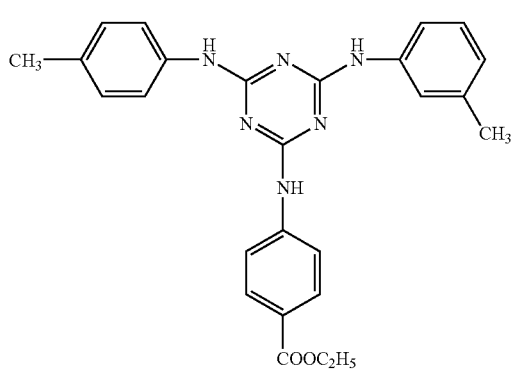
IV-(3)

IV-(4)
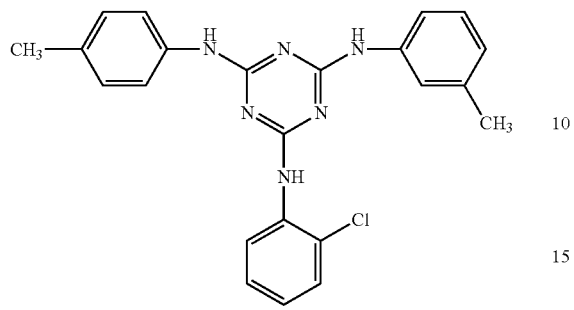

IV-(5)
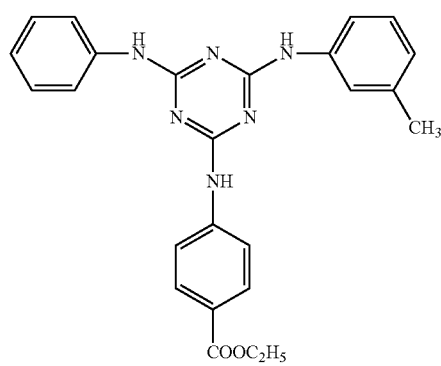

IV-(6)
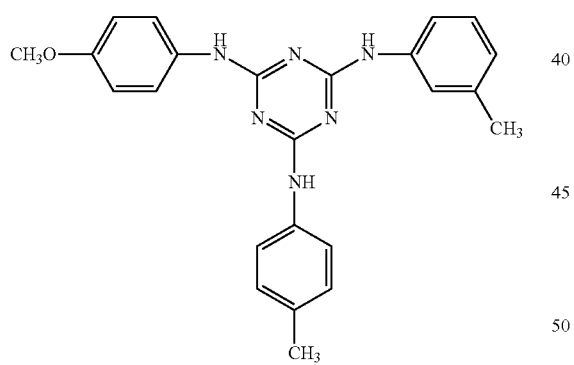

IV-(7)
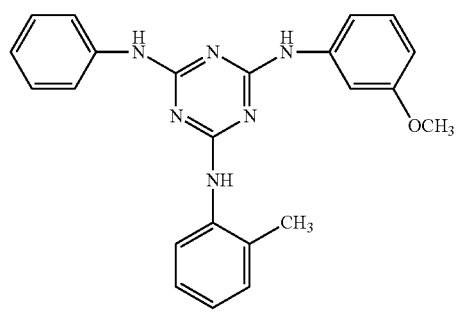

IV-(8)
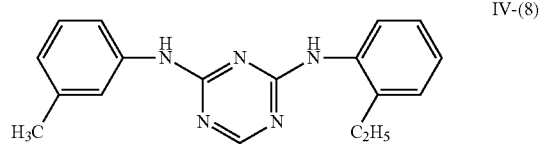

IV-(9)
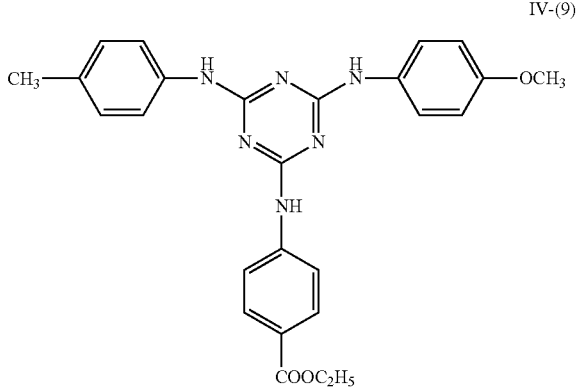

IV-(10)
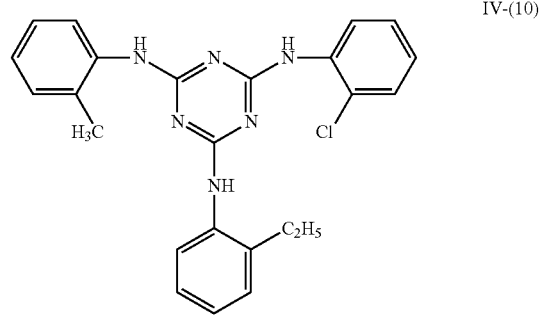 [SMILES: CCc1ccccc1Nc1nc(Nc2ccccc2C)nc(Nc2ccccc2Cl)n1]

(2) Rod-Like Compound

In the invention, the rod-like compound, that is, the compound having a straight line-like molecular structure is preferably used, as well as the discotic compound. Examples of the rod-like compound which can be used in the invention include those described in JP-A 2007-268898, [0053]-[0095].

(3) Positive-Birefringent Compound

A positive-birefringent compound is a polymer as follows: a layer formed of monoaxially oriented molecules of a polymer exhibits a larger refractive index relative to the light coming along the orientation direction and a smaller refractive index relative to the light coming along the perpendicular direction to the orientation direction, and in such a case, the polymer is a positive-birefringent polymer.

Such a positive-birefringent compound is not limited, and examples of the positive-birefringent compound include polymers having intrinsic positive birefringence such as polyamides, polyimides, polyesters, polyetherketones, polyamideimides and polyesterimides; polyetherketones and polyester-based polymers are preferable; and polyester-based polymers are more preferable.

The polyester-based polymers are prepared by carrying out the reaction of the mixture of $C_{2-20}$ aliphatic dicarboxylic acids and $C_{8-20}$ aromatic dicarboxylic acids with at least one diol selected from $C_{2-12}$ aliphatic diols, $C_{4-20}$ alkylether diols and $C_{6-20}$ aromatic diols. If necessary, the both terminals of the products may be blocked by carrying out the reaction with mono carboxylic acid, mono alcohol or phenol. Blocking the terminal may be carried out for avoiding contamination of any free carboxylic acid, and is preferable in terms of preservation stability. The dicarboxylic acids which can be used for preparing the polyester-based polymers are preferably $C_{4-20}$ aliphatic dicarboxylic acids or $C_{8-20}$ aromatic dicarboxylic acids.

Examples of the preferable $C_{2-20}$ aliphatic dicarboxylic acids which can be used preferable include oxalic acid, malonic acid, succinic acid, maleic acid, fumaric acid, glutaric acid, adipic acid, pimelic acid, suberic acid, azelaic acid, sebacic acid, dodecanedicarboxylic acid and 1,4-cyclohexane dicarboxylic acid.

Examples of $C_{8-20}$ aromatic dicarboxylic acid include phthalic acid, terephthalic acid, isophthalic acid, 1,5-naphthalene dicarboxylic acid, 1,4-naphthalene dicarboxylic acid, 1,8-naphthalene dicarboxylic acid, 2,8-naphthalenedicarboxylic acid and 2,6-naphthalene dicarboxylic acid.

Among these aliphatic dicarboxylic acids, malonic acid, succinic acid, maleic acid, fumaric acid, glutaric acid, adipic acid, azelaic acid and 1,4-cyclohexane dicarboxylic acid are preferable; and among these aromatic dicarboxylic acids, phthalic acid, terephthalic acid, is ophthalic acid, 1,5-naphtharene dicarboxylic acid and 1,4-naphtharene dicarboxylic acid are preferable. Among these aliphatic dicarboxylic acids, succinic acid, glutaric acid and adipic acid are especially preferable; and among these aromatic dicarboxylic acids, phthalic acid, terephthalic acid and isophthalic acid are especially preferable.

Any combination of the above-described aliphatic dicarboxylic acid and aromatic dicarboxylic acid may be used, and the combination is not especially limited. Plural types of them may be combined respectively.

The diol or aromatic diol which can be used in the positive birefringent compound may be, for example, selected from $C_{2-20}$ aliphatic diols, $C_{4-20}$ alkylether diols and $C_{6-20}$ aromatic diols.

Examples of $C_{2-20}$ aliphatic diol include alkyl diols and alicyclic diols such as ethane diol, 1,2-propanediol, 1,3-propanediol, 1,2-butanediol, 1,3-butanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethyrol pentane), 2-n-butyl-2-ethyl-1,3-propanediol (3,3-dimethyrol heptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol, and 1,12-octadecanediol. These glycols may be used alone or in combination with other(s).

Ethane diol, 1,2-propanediol, 1,3-propanediol, 1,2-butanediol, 1,3-butanediol, 2-methyl-1,3-propanediol, 1,4-butanediol, 1,5-pentanediol, 3-methyl-1,5-pentanediol, 1,6-hexanediol, 1,4-cyclohexane diol and 1,4-cyclohexane dimethanol are preferable; and ethane dial, 1,2-propanediol, 1,3-propanediol, 1,2-butanediol, 1,3-butanediol, 1,4-butanediol, 1,5-pentanediol, 1,6-hexanediol, 1,4-cyclohexane diol and 1,4-cyclohexane dimethanol are especially preferable.

Preferable examples of $C_{4-20}$ alkylether diol include polytetramethylene ether glycol, polyethylene ether glycol, polypropylene ether glycol and any combinations thereof. The averaged polymerization degree is especially not limited, and preferably from 2 to 20, more preferably from 2 to 10, much more preferably from 2 to 5 and especially preferably from 2 to 4. Examples of such a compound include useful commercially-available polyether glycols such as Carbowax resins, Pluronics resins and Niax resins.

Examples of $C_{6-20}$ aromatic diol include, however are not limited, bisphenol A, 1,2-hydroxy benzene, 1,3-hydroxy benzene, 1,4-hydroxy benzene and 1,4-benzene dimethanol. Bisphenol A, 1,4-hydroxy benzene and 1,4-benzene dimethonal are preferable.

The positive birefringent compound is preferably the compound of which terminals are blocked by any alkyl or aryl group. Protecting the terminals with any hydrophobic group is effective for preventing time degradation under a condition of a high temperature and a high humidity, and this is because it may play a role of prolonging hydrolysis of ester groups.

For avoiding terminal OH or carboxylic acid in the positive birefringent compound, the terminal is preferably blocked with a monoalcohol residue or a monocarboxylic acid residue.

As the monoalcohol, $C_{1-30}$ substituted or non-substituted monoalcohols are preferable, and examples thereof include aliphatic alcohols such as methanol, ethanol, propanol, isopropanol, butanol, isobutanol, pentanol, isopentanol, hexanol, isohexanol, cyclohexyl alcohol, octanol, isooctanol, 2-ethylhexyl alcohol, nonyl alcohol, isononyl alcohol, tert-nonyl alcohol, decanol, dodecanol, dodecahexanol, dodecaoctanol, allyl alcohol and oleyl alcohol; and substituted alcohols such as benzyl alcohol and 3-phenyl propanol.

Preferable examples of the alcohol which can be used for blocking the terminals include methanol ethanol, propanol, isopropanol, butanol, isobutanol, pentanol, isopentanol, hexanol, isohexanol, cyclohexyl alcohol, isooctanol, 2-ethylhexyl alcohol, isononyl alcohol, oleyl alcohol and benzyl alcohol; and much more preferable examples thereof include methanol ethanol, propanol, isobutanol, cyclohexyl alcohol, 2-ethylhexyl alcohol, isononyl alcohol and benzyl alcohol.

When a monocarboxylic acid residue is used for blocking the terminals, monocarboxylic acid, which is used as a monocarboxylic acid residue, is preferably $C_{1-30}$ substituted or non-substituted monocarboxylic acid. It may be an aliphatic monocarboxylic acid or aromatic monocarboxylic acid. Preferable examples of the aliphatic monocarboxylic acid include acetic acid, propionic acid, butane acid, caprylic acid, caproic acid, decane acid, dodecane acid, stearic acid and oleic acid; and preferable examples of the aromatic monocarboxylic acid include benzoic acid, p-tert-butyl benzoic acid, p-tert-amyl benzoic acid, orthotoluic acid, methatoluic acid, paratoluic acid, dimethyl benzoic acid, ethyl benzoic acid, n-propyl benzoic acid, amino benzoic acid and acetoxy benzoic acid. These compounds may be used alone or in combination with other(s).

The positive birefringent compound can be produced with ease according to any conventional method, for example, according to a polyesterification, interesterification or thermal-fusing condensation method of a dicarboxylic acid component and a diol component and/or a monocarboxylic acid or monoalcohol for blocking terminals, or an interfacial condensation method of an acid chloride of a dicarboxylic acid component and a glycol. Polycondensate esters usable in the invention are described in detail in Koichi Murai, "Plasticizers and their Theory and Applications" (by Miyuki Shobo, 1st Ed., issued on Mar. 1, 1973). In addition, also usable herein are materials described JP-A Nos. 5-155809, 5-155810, 5-197073, 2006-259494, 7-330670, 2006-342227, and 2007-3679.

Examples of the positive birefringent compound include, however are not limited to, those shown below.

TABLE 1

| | Dicarboxylic acid | | | Diol | | |
|---|---|---|---|---|---|---|
| | Aromatic dicarboxylic acid | Aliphatic dicarboxylic acid | Ratio of dicarboxylic acids (mol %) | Aliphatic diol | Both terminals | Number-averaged molecular weight |
| P-1 | — | AA | 100 | Ethane diol | hydroxyl | 1000 |
| P-2 | — | AA | 100 | Ethane diol | hydroxyl | 2000 |
| P-3 | — | AA | 100 | Propane diol | hydroxyl | 2000 |
| P-4 | — | AA | 100 | Butane diol | hydroxyl | 2000 |
| P-5 | — | AA | 100 | Hexane diol | hydroxyl | 2000 |
| P-6 | — | AA/SA | 60/40 | Ethane diol | hydroxyl | 900 |
| P-7 | — | AA/SA | 60/40 | Ethane diol | hydroxyl | 1500 |
| P-8 | — | AA/SA | 60/40 | Ethane diol | hydroxyl | 1800 |
| P-9 | — | SA | 100 | Ethane diol | hydroxyl | 1500 |
| P-10 | — | SA | 100 | Ethane diol | hydroxyl | 2300 |
| P-11 | — | SA | 100 | Ethane diol | hydroxyl | 6000 |
| P-12 | — | SA | 100 | Ethane diol | hydroxyl | 1000 |
| P-13 | PA | SA | 50/50 | Ethane diol | hydroxyl | 1000 |
| P-14 | PA | SA | 50/50 | Ethane diol | hydroxyl | 1800 |
| P-15 | PA | AA | 50/50 | Ethane diol | hydroxyl | 2300 |
| P16 | PA | SA/AA | 40/30/30 | Ethane diol | hydroxyl | 1000 |
| P-17 | PA | SA/AA | 50/20/30 | Ethane diol | hydroxyl | 1500 |
| P-18 | PA | SA/AA | 50/30/20 | Ethane diol | hydroxyl | 2600 |
| P-19 | TPA | SA | 50/50 | Ethane diol | hydroxyl | 1000 |
| P-20 | TPA | SA | 50/50 | Ethane diol | hydroxyl | 1200 |
| P-21 | TPA | AA | 50/50 | Ethane diol | hydroxyl | 2100 |
| P-22 | TPA | SA/AA | 40/30/30 | Ethane diol | hydroxyl | 1000 |
| P-23 | TPA | SA/AA | 50/20/30 | Ethane diol | hydroxyl | 1500 |
| P-24 | TPA | SA/AA | 50/30/20 | Ethane diol | hydroxyl | 2100 |
| P-25 | PA/TPA | AA | 15/35/50 | Ethane diol | hydroxyl | 1000 |
| P-26 | PA/TPA | AA | 20/30/50 | Ethane diol | hydroxyl | 1000 |
| P-27 | PA/TPA | SA/AA | 15/35/20/30 | Ethane diol | hydroxyl | 1000 |
| P-28 | PA/TPA | SA/AA | 20/30/20/30 | Ethane diol | hydroxyl | 1000 |
| P-29 | PA/TPA | SA/AA | 10/50/30/10 | Ethane diol | hydroxyl | 1000 |
| P-30 | PA/TPA | SA/AA | 5/45/30/20 | Ethane diol | hydroxyl | 1000 |
| P-31 | — | AA | 100 | Ethane diol | acetyl ester residue | 1000 |
| P-32 | — | AA | 100 | Ethane diol | acetyl ester residue | 2000 |
| P-33 | — | AA | 100 | Propane diol | acetyl ester residue | 2000 |
| P-34 | — | AA | 100 | Butane diol | acetyl ester residue | 2000 |
| P-35 | — | AA | 100 | Hexane diol | acetyl ester residue | 2000 |
| P-36 | — | AA/SA | 60/40 | Ethane diol | acetyl ester residue | 900 |

TABLE 2

| | Dicarboxylic acid | | | Diol | | |
|---|---|---|---|---|---|---|
| | Aromatic dicarboxylic acid | Aliphatic dicarboxylic acid | Ratio of dicarboxylic acids (mol %) | Aliphatic diol | Both terminals | Number-averaged molecular weight |
| P-37 | — | AA/SA | 60/40 | Ethane diol | acetyl ester residue | 1000 |
| P-38 | — | AA/SA | 60/40 | Ethane diol | acetyl ester residue | 2000 |
| P-39 | — | SA | 100 | Ethane diol | acetyl ester residue | 1000 |
| P-40 | — | SA | 100 | Ethane diol | acetyl ester residue | 3000 |
| P-41 | — | SA | 100 | Ethane diol | acetyl ester residue | 5500 |
| P-42 | — | SA | 100 | Ethane diol | acetyl ester residue | 1000 |
| P-43 | PA | SA | 50/50 | Ethane diol | acetyl ester residue | 1000 |
| P-44 | PA | SA | 50/50 | Ethane diol | acetyl ester residue | 1500 |

TABLE 2-continued

| | Dicarboxylic acid | | | Diol | | |
|---|---|---|---|---|---|---|
| | Aromatic dicarboxylic acid | Aliphatic dicarboxylic acid | Ratio of dicarboxylic acids (mol %) | Aliphatic diol | Both terminals | Number-averaged molecular weight |
| P-45 | PA | AA | 50/50 | Ethane diol | acetyl ester residue | 2000 |
| P-46 | PA | SA/AA | 40/30/30 | Ethane diol | acetyl ester residue | 1000 |
| P-47 | PA | SA/AA | 33/33/34 | Ethane diol | benzoic acid | 1000 |
| P-48 | PA | SA/AA | 50/20/30 | Ethane diol | acetyl ester residue | 1500 |
| P-49 | PA | SA/AA | 50/30/20 | Ethane diol | acetyl ester residue | 2000 |
| P-50 | TPA | SA | 50/50 | Ethane diol | acetyl ester residue | 1000 |
| P-51 | TPA | SA | 50/50 | Ethane diol | acetyl ester residue | 1500 |
| P-52 | TPA | SA | 45/55 | Ethane diol | acetyl ester residue | 1000 |
| P-53 | TPA | AA | 50/50 | Ethane diol | acetyl ester residue | 2200 |
| P-54 | TPA | SA | 35/65 | Ethane diol | acetyl ester residue | 1000 |
| P-55 | TPA | SA/AA | 40/30/30 | Ethane diol | acetyl ester residue | 1000 |
| P-56 | TPA | SA/AA | 50/20/30 | Ethane diol | acetyl ester residue | 1500 |
| P-57 | TPA | SA/AA | 50/30/20 | Ethane diol | acetyl ester residue | 2000 |
| P-58 | TPA | SA/AA | 20/20/60 | Ethane diol | acetyl ester residue | 1000 |
| P-59 | PA/TPA | AA | 15/35/50 | Ethane diol | acetyl ester residue | 1000 |
| P-60 | PA/TPA | AA | 25/25/50 | Ethane diol | acetyl ester residue | 1000 |
| P-61 | PA/TPA | SA/AA | 15/35/20/30 | Ethane diol | acetyl ester residue | 1000 |
| P-62 | PA/TPA | SA/AA | 20/30/20/30 | Ethane diol | acetyl ester residue | 1000 |
| P-63 | PA/TPA | SA/AA | 10/50/30/10 | Ethane diol | acetyl ester residue | 1000 |
| P-64 | PA/TPA | SA/AA | 5/45/30/20 | Ethane diol | acetyl ester residue | 1000 |
| P-65 | PA/TPA | SA/AA | 5/45/20/30 | Ethane diol | acetyl ester residue | 1000 |
| P-66 | IPA | AA/SA | 20/40/40 | Ethane diol | acetyl ester residue | 1000 |
| P-67 | 2,6-NPA | AA/SA | 20/40/40 | Ethane diol | acetyl ester residue | 1200 |
| P-68 | 1,5-NPA | AA/SA | 20/40/40 | Ethane diol | acetyl ester residue | 1200 |
| P-69 | 1,4-NPA | AA/SA | 20/40/40 | Ethane diol | acetyl ester residue | 1200 |
| P-70 | 1,8-NPA | AA/SA | 20/40/40 | Ethane diol | acetyl ester residue | 1200 |
| P-71 | 2,8-NPA | AA/SA | 20/40/40 | Ethane diol | acetyl ester residue | 1200 |

In Tables 1 and 2, PA means phthalic acid; TPA means terephthalic acid; IPA means isophthalic acid; AA means adipic acid; SA means succinic acid; 2,6-NPA means 2,6-naphthalene dicarboxylic acid; 2,8-NPA means 2,8-naphthalene dicarboxylic acid; 1,5-NPA means 1,5-naphthalene dicarboxylic acid; 1,4-NPA means 1,4-naphthalene dicarboxylic acid; and 1,8-NPA means 1,8-naphthalene dicarboxylic acid.

The amount of such the positive birefringent compound is preferably from 1 to 30 parts by mass, more preferably from 4 to 25 parts by mass and much more preferably from 10 to 20 parts by mass with respect to 100 parts by mass of the cellulose acylate.

The cellulose acylate solution to be used for preparing the cellulose acylate-based film may be added with any additive other than the retardation enhancer. Examples of another additive include antioxidants, UV inhibitors, peeling promoters, plasticizers, agents for controlling wavelength-dispersion, fine particles and agents for controlling optical properties. They may be selected from any known additives.

The cellulose acylate solution for the rear-side or front-side retardation region may be added with any plasticizer in order to improve the mechanical properties of the prepared film or the drying rate. Examples of the plasticizer which can be used in the invention include those described in JP-A 2008-181105, [0067].

Any cycloolefin-based polymer film is preferably used as a retardation film constituting the second retardation region. Regarding the materials and methods employing the materials for preparing the cycloolefin-based polymer film, details are described in JP-A 2006-293342, [0098]-[0193], which can be referred to in the invention. Examples of the retardation film, constituting the second retardation region, include norbornene-based polymers such as ARTON (manufactured by JSR Corporation, and ZEONOR (manufactured by ZEON Corporation).

Various methods may be used for producing the retardation film constituting the second retardation region. For example, a solution casting method, melt-extrusion method, calendar method or condensing forming method may be used. Among these, a solution casting method and melt-extrusion method are preferable. And the retardation film constituting the second retardation region may be a film prepared by being subjected to a stretching treatment after forming. Stretching the film may be carried out according to a monoaxially or biaxially stretching method. Simultaneously- or successively-biaxially stretching is preferable. For achieving high optical anisotropy, a film should be subjected to a stretching treatment by a high stretching ratio. For example, the film is preferably subjected to a stretching treatment in both of the width direction and the lengthwise direction (machine direction). The stretching ratio is preferably from 3 to 100%. The stretching treatment may be carried out by using a tenter. Or the longitudinally stretching treatment may be carried out between the rolls.

As a solvent cast method, solution lamination-casting method such as co-solvent cast method, solution successive-casting method and coating method may be used. Using a co-solvent cast method or successive-solvent method, plural cellulose acylate solutions (dopes) for forming the layers respectively are prepared. According to a solution co-casting method (simultaneous multilayered casting), each dope for each layer of plural layers (for example three or more layers) is extruded simultaneously from each slit on a casting-support (such as band or drum) by using a geeser for casting, then peeled off from the support at an appropriate time, and then dried to form a film.

According to a solution successive-casting method, at first, a dope of the first layer is extruded from a geeser for casting to be cast on a support; and, after being dried or not being dried, then a dope for the second layer is extruded from the geeser for casting to be cast on the first layer. And if necessary, the three or more dopes are successively cast and laminated in this manner, then removed from the support at the appropriate time, and dried to form a film. According to a coating method, generally, a core layer is prepared according to a solution casting method. And then, a prepared coating liquid is applied to the surfaces of the core layer respectively or simultaneously by using an appropriate apparatus and dried to form a layered film.

The retardation film constituting the retardation region may be a layer formed of a liquid-crystal composition fixed in a desired alignment state, or a lamination containing such a layer and a polymer film supporting the layer. In the latter embodiment, the polymer film may be used as a protective film of the polarizing element. Examples of the liquid crystal which can be used for preparing the retardation film constituting the retardation region include rod-like liquid crystals, discotic liquid crystals and cholesteric liquid crystals.

Previously, as the VA-mode liquid-crystal display device, it has been a problem reducing a visual quality by the light leakage at the time of black level of the four corners of the display, so-called "un evenness at the corner-side". For reducing unevenness at the corner-side, it is necessary to reduce the deformation of the retardation film caused by external force to be applied to the film. If the retardation film is too thin, the retardation film is easily subjected to tensile force, and the unevenness at the corner-side is easily increased. The thickness of the retardation film disposed at the rear-side, constituting the retardation region is preferably equal to or more than 10 micro meters and equal to or more than 20 micro meters.

2. Polarizing Element

The polarizing element disposed at the front-side or rear-side is not limited. Any normal linear polarizing film can be used. The linear polarizing film is preferably a coated polarizing film as represented by a product of Optiva Inc., or a polarizing film formed by a binder and iodine or a dichroic dye. In the linear polarizing film, iodine or dichroic dye is aligned in the binder to exhibit a polarizing ability. The iodine or dichroic dye is preferably aligned along the binder molecules, or by an auto-texturing as in liquid crystal. The currently available commercial polarizer is generally prepared by immersing a stretched polymer film in a solution of iodine or a dichroic dye in a bath, thereby penetrating iodine or dichroic dye into the binder.

3. Protective Film

To the both surfaces of the front-side or rear-side polarizing element, a protective film is preferably bonded. Each of the protective films disposed at the liquid-crystal cell side constitutes a part of the rear-side or front-side retardation regions, and the former is required to satisfy the above formula (I). The latter constitutes a part of the front-side retardation region, and in some embodiments, it is required to exhibit the optical properties, which can contribute to improving the viewing angle CR, alone or in combination with other layer(s).

The protective film disposed on the outside of the front-side or rear-side polarizing element is especially not limited. Any polymer films may be used. Examples of the film are same as those which are exemplified above as examples of the retardation film constituting the first retardation region. For example, films containing cellulose acylate (e.g., cellulose acetate, cellulose propionate and cellulose butyrate), polyolefin (e.g., norbornene-based polymer, and polypropylene), poly(meth)acrylic acid ester (e.g., polymethylmethacrylate), polycarbonate, polyester or polysulfones as a major ingredient are exemplified. Commercially available polymer films (e.g., regarding cellulose acylate film, "TD80UL" (manufactured by FUJIFILM), and regarding norbornene-based polymer film, ARTON (manufactured by JSR) and ZEONOR (manufactured by NIPPON ZEON)) can be also used.

EXAMPLES

The invention is described in more detail with reference to the following Examples. In the following Examples, the amount of the material, reagent and substance used, their ratio, the operation with them and the like may be suitably modified or changed not overstepping the spirit and the scope of the invention. Accordingly, the scope of the invention should not be limited to the following.

1. Preparation of Films 1 to 11:

(1) Preparation of Film 1:

A cellulose acylate having an acyl group and a degree of acyl substitution shown in the following Table was prepared. Concretely, a catalyst, sulfuric acid (in an amount of 7.8 parts by mass relative to 100 parts by mass of cellulose) was added to cellulose, and then a carboxylic acid to give the acyl group was added thereto, and the cellulose was acylated at 40° C. In this, the type and the amount of the carboxylic acid were changed to thereby change and control the type of the acyl group and the degree of substitution with the acyl group. After the acylation, the product was aged at 40° C. The low-molecular component was removed from the cellulose acylate by washing with acetone. In the Table, Ac means an acetyl group, and CTA means cellulose triacetate (cellulose ester derivative in which the acyl groups are all acetate groups).

(Cellulose Acylate Solution)

The following composition was put into a mixing tank and stirred to dissolve the ingredients. After heated at 90° C. for about 10 minutes, this was filtered through a paper filter having a mean pore size of 34 μm and a sintered metal filter having a mean pore size of 10 μm.

| Cellulose Acylate Solution | |
|---|---|
| CTA shown the Table below | 100.0 mas. pts. |
| Triphenyl phosphate (TPP) | 7.8 mas. pts. |
| Biphenyldiphenyl phosphate (BDP) | 3.9 mas. pts. |
| Methylene chloride | 403.0 mas. pts. |
| Methanol | 60.2 mas. pts. |

(Mat Agent Dispersion)

The following composition containing the cellulose acylate solution that had been prepared according to the above method was put into a disperser and dispersed to prepare a mat agent dispersion.

| Mat Agent Dispersion | |
|---|---|
| Silica particles having a mean particle size of 16 nm (Aerosil R972, by Nippon Aerosil) | 2.0 mas. pts. |
| Methylene chloride | 72.4 mas. pts. |
| Methanol | 10.8 mas. pts. |
| Cellulose acylate solution | 10.3 mas. pts. |

(Additive Solution)

The following composition containing the cellulose acylate solution that had been prepared according to the above method was put into a mixing tank and dissolved by stirring under heat to prepare an additive solution.

| Additive Solution | |
|---|---|
| Retardation enhancer (1) | 20.0 mas. pts. |
| Methylene chloride | 58.3 mas. pts. |
| Methanol | 8.7 mas. pts. |
| Cellulose acylate solution | 12.8 mas. pts. |

100 parts by mass of the cellulose acylate solution, 1.35 parts by mass of the mat agent dispersion, and the additive solution in such an amount that the amount of the retardation enhancer (1) in the cellulose acylate film to be formed could be 10 parts by mass were mixed to prepare a dope for film formation. The amount of the additive is by mass relative to 100 parts by mass of the amount of the cellulose acylate.

The abbreviations of the additive and the plasticizer in the following Table are as follows:

CTA: triacetyl cellulose
TPP: triphenyl phosphate
BDP: biphenyldiphenyl phosphate Retardation Enhancer (1):

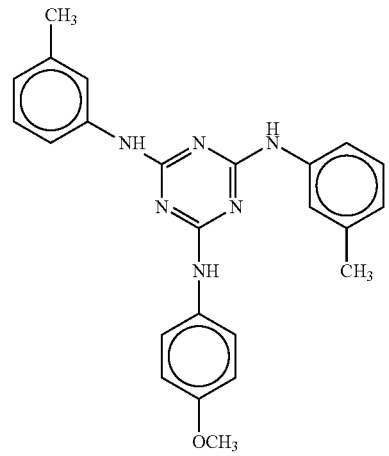

Using a band caster, the above dope was cast. The film having a residual solvent amount shown in the following Table was peeled away from the band, and in the section from the peeling to the tenter, this was stretched in the machine direction at the draw ratio shown in the following Table, and then, using a tenter, stretched in the transverse direction at the draw ratio shown in the following Table 3. Immediately after the cross stretching, the film was shrunk (relaxed) in the transverse direction at the ratio shown in the following Table, and then the film was removed from the tenter. The process gave a cellulose acylate film. The residual solvent amount in the film removed from the tenter was as in the following Table 3. Both edges of the film were trimmed away just before the winding zone to make the film have a width of 2000 mm, and the film was wound up into a roll film having a length of 4000 m. The draw ratio in stretching is shown in the following Table.

TABLE 3

| Cellulose acylate-based film | | Film 1 |
|---|---|---|
| Cellulose | Cellulose Type | CTA |
| | Total degree of substitution | 2.81 |
| | Ratio of 6-position substitution | 0.320 |
| | Degree of 6-position substitution | 0.9 |
| | Substituent | Ac |
| Additive | Additive Type | Retardation enhancer (1) |
| | Amount [parts by mass relative to 100 parts by mass of cellulose] | 10 |
| Plasticizer | Plasticizer Type | TPP/BDP |
| | Amount [parts by mass relative to 100 parts by mass of cellulose] | 7.8/3.9 |

TABLE 3-continued

| | Cellulose acylate-based film | Film 1 |
|---|---|---|
| Stretching condition | Ratio of longwise stretching [%] | 20 |
| | Ratio of cross stretching [%] | 40 |
| | Ratio of shrinking [%] | 7 |
| | Stretching speed [%/min] | 35 |
| | Film surface temperature [□] | 120 |
| | Amount of residual solvent at the time of peeling off [%] | 50 |
| | Amount of residual solvent at the time of termination of stretching [%] | 10 |

Thus produced, the cellulose acylate film was used as a film 1.

(2) Preparation of Film 2:

A commercially-available norbornene polymer film, ZEONOR ZF14-100 (by Optes) was stretched at a temperature of 142° C. in a mode of edge-fixed biaxial stretching in MD by 1.55 times and in TD by 1.8 times, and then its surface was processed for corona discharge treatment, using a solid state corona discharger, 6 KVA (by Pillar). This was used as film 2. The thickness of the film was 38 μm.

(3) Preparation of Film 3:

Cellulose acylate propionate, CAP482-20 (by Eastman Chemical, having a degree of acetyl substitution of 0.2 and a degree of propionyl substitution of 2.4) was prepared. A plasticizer, 1,4-phenylene-tetraphenyl phosphate (8% by mass) and an antiaging agent (antioxidant), IRGANOX-1010 (by Ciba Specialty Chemicals) (0.5% by mass) were added thereto, and mixed for 30 minutes with a tumbler mixer. The resulting mixture was dried with a moisture-removing hot air drier (Matsui Seisaku-sho's DMZ2), at a hot air temperature of 150° C. and at a dew point of −36° C. Next, the mixture was fed into a double-screw extruder (by Technovel); and with adding thereto a mat agent, AEROSIL 200V (0.016-μm silica fine particles by Nippon Aerosil) through the additive hopper port provided in the intermediate part of the extruder via a continuous feeder so that its throughput flow could be 0.05%, and also thereto, a UV absorbent, TINUVIN 360 (by Ciba Specialty Chemicals) through the same port to be at a throughput flow of 0.5%, the mixture was melt-extruded. Thus melt-extruded, the film formed had a thickness of 220 μm.

The film was biaxially stretched at a temperature of 142° C. in MD by 1.3 times and in TD by 2.4 times with its edges fixed. This film was used as film 3. The thickness of the film was 72 μm.

(4) Preparation of Film 4:

2,2'-Bis(3,4-dicarboxyphenyl)-hexafluoropropane dianhydride (17.77 g, 40 mmol) and 2,2-bis(trifluoromethyl)-4,4'-diaminobiphenyl (12.81 g, 40 mmol) were put into a reactor (500 mL) equipped with a mechanical stirrer, a Dean Stark device, a nitrogen introducing duct, a thermometer and a condenser tube. Subsequently, a solution prepared by dissolving isoquinoline (2.58 g, 20 mmol) in m-cresol (275.21 g) was added to it, and stirred (600 rpm) at 23° C. for 1 hour to give a uniform solution. Next, using an oil bath, the reactor was heated so that the temperature inside the reactor could reach 180±3° C., and this was stirred for 5 hours with its temperature kept as such to give a yellow solution. Further, this was stirred for 3 hours, then the heating and stirring was stopped, and this was left cooled to room temperature to give a polymer gel precipitated therein.

Acetone was added to the yellow solution in the reactor to completely dissolve the gel, thereby preparing a diluted solution (7% by weight). The diluted solution was put into isopropyl alcohol (2 L) little by little with stirring, thereby giving a white powder precipitated therein. The powder was collected through filtration, put into isopropyl alcohol (1.5 L) and washed therein. This operation was repeated once again for washing it, and the powder was again collected through filtration. This was dried in an air-circulating thermostat oven at 60° C. for 48 hours, and then dried at 150° C. for 7 hours to give a polyimide having a recurring unit of the following formula (1) as a white powder (yield, 85%). The weight-average molecular weight (Mw) of the polyimide was 124,000 and the degree of imidation thereof was 99.9%.

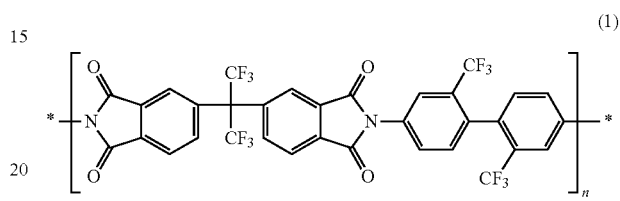

(1)

17.7 parts by weight of the polyimide (white powder) produced in the above was dissolved in 100 parts by weight of methyl isobutyl ketone (boiling point, 116° C.) to prepare a 15 wt. % polyimide solution.

Apart from this, a transparent film was prepared by coating the surface of a commercially-available cellulose acylate film, TD80UL (trade name by FUJIFILM) with an anchor coat layer, and the polyimide solution was applied onto the surface of the anchor coat layer in one direction using a rod coater. Next, this was dried in an air-circulating thermostat oven at 135±1° C. for 5 minutes to evaporate the solvent, thereby producing a transparent film having a 3.0 μm-thick polyimide layer (overall thickness, 83.8 μm). Subsequently, the polyimide layer-having transparent film was, while kept heated in an air-circulating thermostat oven at 150±1° C., monoaxially stretched in the transverse direction by 1.22 times with the machine direction of the film kept fixed, using a tenter stretcher, and then relaxed in the transverse direction by 0.97 times to produce a laminate film. Thus stretched, the laminate film was used as film 4.

(5) Preparation of Film 5:

The following composition was put into a mixing tank and stirred under heat to dissolve the ingredients. This was filtered through a paper filter having a mean pore size of 34 μm and a sintered metal filter having a mean pore size of 10 μm to prepare a cellulose acylate solution.

(Cellulose Acylate Solution)

| | |
|---|---|
| Cellulose acetate having a degree of substitution of 2.81 | 100.0 mas. pts. |
| Retardation enhancer (1) | 8.5 mas. pts. |
| Retardation enhancer (3) | 7.0 mas. pts. |
| Methylene chloride | 428.4 mas. pts. |
| Methanol | 64.0 mas. pts. |

The composition of the retardation enhancer (3) is shown in Table 4 below. In Table 4, EG means ethylene glycol, TPA means terephthalic acid, PA means phthalic acid, AA means adipic acid, SA means succinic acid. The retardation enhancer (3) is a non-phosphate compound, and is a compound functioning as a retardation enhancer. The terminal of the retardation enhancer (3) is blocked with an acetyl group.

TABLE 4

| Retardation enhancer | Glycol unit | | Averaged number of carbon atoms | Dicarboxylic acid unit | | | | Averaged number of carbon atoms | Molecular weight |
|---|---|---|---|---|---|---|---|---|---|
| | Ratio of blocking both terminal hydroxyls (%) | EG (%) | | TPA (mole %) | PA (mole %) | AA (mole %) | SA (mole %) | | |
| (3) | 100 | 100 | 2 | 45 | 5 | 20 | 30 | 6 | 840 |

The cellulose acylate solution prepared in the above was rapidly cast, using a band caster. The film having a residual solvent amount of about 30% by mass was peeled away from the band, and stretched in the transverse direction at 140° C. and at a draw ratio of 16%, using a tenter. Next, the film was changed from tenter conveyance to roll conveyance, and further dried from 110° C. to 150° C. and wound up. Thus, a film 5 was produced. The thickness of the film was 83 μm.

The production of the film 5 was free from the problems with the production of the film 1 (smoking in high-temperature treatment in the drying step, adhesion of vaporized oil to the parts of the machine to cause operation failure or adhesion thereof to film to cause surface failure of the film).

This is because the retardation enhancer (3) used in the production of the film 5 functions also as a plasticizer, and therefore, the production of the film 5 does not require the conventional low-molecular-weight plasticizers TPP and BDP as in the production of the film 1.

Use of the compound having a positive birefringence such as the retardation enhancer (3) solves the above-mentioned problems, and therefore, it may be said that the compound having a positive birefringence is a preferred retardation enhancer for film production.

(6) Preparation of Film 6:

A film was produced in the same manner as that for the film 1, for which, however, the cellulose acylate shown in the Table below was used as the starting material and the production condition was changed to the Table below. This is a film 6. The abbreviations of the additive and the plasticizer mentioned below are the same as above.

TABLE 5

| Cellulose acylate film | | Film 6 |
|---|---|---|
| Cellulose | Cellulose Type | CTA |
| | Total degree of substitution | 2.81 |
| | Ratio of 6-position substitution | 0.320 |
| | Degree of 6-position substitution | 0.9 |
| | Substituent | Ac |
| Additive | Additive Type | Retardation enhancer (1)/ Retardation enhancer (2) |
| | Amount [parts by mass relative to 100 parts by mass of cellulose] | 3.2/7.7 |
| Plasticizer | Plasticizer Type | TPP/BDP |
| | Amount [parts by mass relative to 100 parts by mass of cellulose] | 7.8/3.9 |
| Stretching condition | Ratio of longwise stretching [%] | 3 |
| | Ratio of cross stretching [%] | 47 |
| | Ratio of shrinking [%] | 7 |
| | Stretching speed [%/min] | 35 |
| | Film surface temperature [□] | 120 |
| | Amount of residual solvent at the time of peeling off [%] | 55 |
| | Amount of residual solvent at the time of termination of stretching [%] | 13 |

Retardation Enhancer (2):

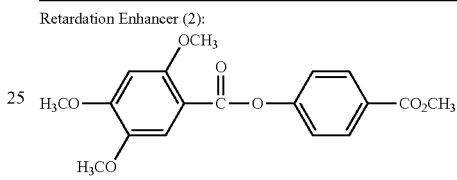

(7) Preparation of Film 7:

A film was produced in the same manner as that for the film 1, for which, however, the cellulose acylate shown in the Table below was used as the starting material and the production condition was changed to the Table below. This was used as film 7. The abbreviations of the additive and the plasticizer mentioned below are the same as above.

TABLE 6

| Cellulose acylate film | | Film 7 |
|---|---|---|
| Cellulose | Cellulose Type | CTA |
| | Total degree of substitution | 2.81 |
| | Ratio of 6-position substitution | 0.320 |
| | Degree of 6-position substitution | 0.9 |
| | Substituent | Ac |
| Additive | Additive Type | Retardation enhancer (1) |
| | Amount [parts by mass relative to 100 parts by mass of cellulose] | 7 |
| Plasticizer | Plasticizer Type | TPP/BDP |
| | Amount [parts by mass relative to 100 parts by mass of cellulose] | 7.8/3.9 |
| Stretching condition | Ratio of longwise stretching [%] | 28 |
| | Ratio of cross stretching [%] | 60 |
| | Ratio of shrinking [%] | 7 |
| | Stretching speed [%/min] | 100 |
| | Film surface temperature [□] | 160 |
| | Amount of residual solvent at the time of peeling off [%] | 45 |
| | Amount of residual solvent at the time of termination of stretching [%] | 10 |

(8) Preparation of Film 8:

A commercially-available cellulose acylate film, TD80UL (trade name by FUJIFILM) was prepared, and this was used as film 8.

(9) Preparation of Film 9:

A film was produced in the same manner as that for the film 7, for which, however, the amount of the retardation enhancer (1) to be added was changed to 7.2 parts by mass, the MD draw ratio was changed to 35%, and the TD draw ratio was changed to 75%. This was used as film 9.

(10) Preparation of Film 10:
(Cellulose Acylate Solution for Low-Substitution Layer)

The following composition was put into a mixing tank and stirred under heat to dissolve the ingredients, thereby preparing a cellulose acylate solution for low-substitution layer.

| | |
|---|---|
| Cellulose acetate having a degree of substitution of 2.43 | 100.0 mas. pts. |
| Retardation enhancer (1) | 4.0 mas. pts. |
| Retardation enhancer (4) | 10.0 mas. pts. |
| Methylene chloride | 351.5 mas. pts. |
| Methanol | 52.5 mas. pts. |

The composition of the retardation enhancer (4) is shown in Table 7 below. In Table 7, EG means ethylene glycol, PG means propylene glycol, BG means butylene glycol, TPA means terephthalic acid, PA means phthalic acid, AA means adipic acid, SA means succinic acid. The retardation enhancer (4) is a non-phosphate compound, and is a compound functioning as a retardation enhancer. The terminal of the retardation enhancer (4) is blocked with an acetyl group.

TABLE 7

| | Glycol unit | | | Dicarboxylic acid unit | | | |
|---|---|---|---|---|---|---|---|
| Retardation enhancer | Ratio of blocking both terminal hydroxyls (%) | EG (%) | PG (5) | Averaged number of carbon atoms | TPA (mole %) | SA (mole %) | Averaged number of carbon atoms | Molecular weight |
| (4) | 100 | 50 | 50 | 2.5 | 55 | 45 | 6.2 | 730 |

(Cellulose Acylate Solution for High-Substitution Layer)

The following composition was put into a mixing tank and stirred to dissolve the ingredients, thereby preparing a cellulose acylate solution for high-substitution layer.

| | |
|---|---|
| Cellulose acetate having a degree of substitution of 2.79 | 100.0 mas. pts. |
| Retardation enhancer (4) | 11.0 mas. pts. |
| Silica particles having a mean particle size of 16 nm (Aerosil R972, by Nippon Aerosil) | 0.15 mas. pts. |
| Methylene chloride | 395.0 mas. pts. |
| Methanol | 59.0 mas. pts. |

(Production of Cellulose Acylate Sample)

The two cellulose acylate solutions were cast onto a band to form thereon a core layer having a thickness of 82 μm from the cellulose acylate solution for low-substitution layer and to form a skin layer A and a skin layer B each having a thickness of 2 μm from the cellulose acylate solution for high-substitution layer. The formed film was peeled away from the band, clipped, and stretched in the transverse direction by 18% at a stretching temperature of 180° C. while the residual solvent amount was 20% relative to the total mass of the film, using a tenter. Next, the film was unclipped and dried at 130° C. for 20 minutes. This was used as film 10.

(11) Preparation of Film 11:
(Cellulose Acylate Solution for Low-Substitution Layer)

The following composition was put into a mixing tank and stirred under heat to dissolve the ingredients, thereby preparing a cellulose acylate solution for low-substitution layer.

| | |
|---|---|
| Cellulose acetate having a degree of substitution of 2.43 | 100.0 mas. pts. |
| Retardation enhancer (4) | 18.5 mas. pts. |
| Methylene chloride | 365.5 mas. pts. |
| Methanol | 54.6 mas. pts. |

(Cellulose Acylate Solution for High-Substitution Layer)

The following composition was put into a mixing tank and stirred to dissolve the ingredients, thereby preparing a cellulose acylate solution for high-substitution layer.

| | |
|---|---|
| Cellulose acetate having a degree of substitution of 2.79 | 100.0 mas. pts. |
| Retardation enhancer (4) | 11.0 mas. pts. |
| Silica particles having a mean particle size of 16 nm (Aerosil R972, by Nippon Aerosil) | 0.15 mas. pts. |
| Methylene chloride | 395.0 mas. pts. |
| Methanol | 59.0 mas. pts. |

(Production of Cellulose Acylate Sample)

The two cellulose acylate solutions were cast onto a band to form thereon a core layer having a thickness of 38 μm from the cellulose acylate solution for low-substitution layer and to form a skin layer A and a skin layer B each having a thickness of 2 μm from the cellulose acylate solution for high-substitution layer. The formed film was peeled away from the band, dried at a temperature of 200° C. for 30 minutes while the residual solvent amount was 20% relative to the total mass of the film, and then further dried at 130° C. for 20 minutes. This was used as film 11.

2. Properties of Films 1 to 11:

The properties of the above films 1 to 11 are shown in the following Table. Re(550) and Rth(550) of each film were measured as follows: A sample having a size of 30 mm×40 mm of each film was conditioned at 25° C. and 60% RH for 2 hours, and analyzed with KOBRA 21ADH (by Oji Scientific Instruments) at a wavelength of 550 nm. For the films 1, 3, and 5 to 11, an assumed mean refractive index of 1.48 and the film thickness were inputted and the data were computed. For the other films, the assumed refractive index was 1.53 for the film 2, and 1.58 for the film 4.

TABLE 8

| | Thickness (μm) | Re (550) (nm) | Rth (550) (nm) |
|---|---|---|---|
| Film 1 | 78 | 60 | 250 |
| Film 2 | 38 | 60 | 250 |
| Film 3 | 72 | 60 | 250 |
| Film 4 | 80 | 60 | 250 |

TABLE 8-continued

|        | Thickness (μm) | Re (550) (nm) | Rth (550) (nm) |
|--------|----------------|---------------|----------------|
| Film 5  | 83 | 60  | 250 |
| Film 6  | 44 | 75  | 160 |
| Film 7  | 64 | 70  | 205 |
| Film 8  | 80 | 1   | 43  |
| Film 9  | 58 | 67  | 230 |
| Film 10 | 86 | 60  | 250 |
| Film 11 | 42 | 0.5 | 43  |

3. Production of Polarizer:

A polyvinyl alcohol (PVA) film having a thickness of 80 μm was dyed by dipping it in an aqueous iodine solution having an iodine concentration of 0.05% by mass at 30° C. for 60 seconds, then stretched in the machine direction by 5 times the original length while dipped in an aqueous boric acid solution having a boric acid concentration of 4% by mass for 60 seconds, and thereafter dried at 50° C. for 4 minutes to give a polarizing film having a thickness of 20 μm.

Of the above-mentioned films 1 to 11, the cellulose acylate films were saponified as follows: Each film was dipped in an aqueous sodium hydroxide solution (1.5 mol/liter) at 55° C., and then fully rinsed with water to remove sodium hydroxide. Next, this was dipped in an aqueous diluted sulfuric acid solution (0.005 mol/liter) at 35° C. for 1 minute, and then dipped in water to fully remove the aqueous diluted sulfuric acid solution. Finally, the sample was fully dried at 120° C.

Any two sheets of the films 1 to 11 were combined with the polarizing film sandwiched therebetween to produce a laminate polarizer. The combination is shown in Table below.

The cellulose acylate films 1 and 3 to 11 were stuck, using a polyvinyl alcohol adhesive; and the norbornene polymer film 2 was using an acrylic adhesive.

The films 1 to 7, 9 and 10 were so stuck that the in-plane slow axis thereof could be in parallel to the transmission axis of the polarizing element; and the films 8 and 11 were so stuck that the in-plane slow axis thereof could be perpendicular to the transmission axis of the polarizing element.

4. Preparation of Liquid-Crystal Cell Substrate:
(1) Front-Side Substrate 1:
(1)-1 Formation of Red Pixel Member:
<Formation of Curable Composition Layer (Coating Film)>

A coloring photosensitive composition of Comparative Example 12 in JP-A 2009-144126 was dispersed for 30 minutes with a bead disperser Ultra-apex Mill (by Kotobuki Kogyo) using 0.05 mmϕ zirconia beads, and the thus-processed composition was applied in a mode of slit-coating, to a glass substrate (550 mm×650 mm) with a black matrix (BM) formed on one surface thereof, on the BM-formed surface thereof, using a slit coating apparatus equipped with a slit head having a slit clearance of 100 μm and a coating effective width of 500 mm, thereby forming a curable composition layer (coating film) on the substrate.

In the slit coating, the distance between the slit and the glass substrate and the flow rate of the coating liquid were so controlled that the thickness of the layer after post-baking could be 2.0 μm. The coating rate was 100 mm/sec.
<Exposure to Light, Development, Rinsing>

Next, the curable composition layer was pre-baked with a hot plate at 80° C. for 120 seconds, and then exposed to light at 90 mJ/cm² through a proximity gap of 180 μm, using an exposure apparatus, Hitachi's LE5565 (illuminance, 20 mW/cm²). The exposed substrate was shower-developed with a 1.0% developer (25° C.) of a potassium hydroxide developer, CDK-1 (by FUJIFILM Electronics Materials) for 60 seconds, and then rinsed with pure water.

In that manner, a red pixel member was formed on the glass substrate. The substrate was post-baked in an oven at 220° C. for 30 minutes, thereby giving a glass substrate with red pixel formed thereon.
(1)-2 Formation of Green Pixel Member:

A green pixel member was formed on the red pixel-formed glass substrate in the same manner as that for the formation of the red pixel member, for which, however, a coloring photosensitive composition of Comparative Example 13 in JP-A 2009-144126, which had been further dispersed for 30 minutes with a bead disperser Ultra-apex Mill (by Kotobuki Kogyo) using 0.05 mmϕ zirconia beads, was used. The substrate was post-baked in an oven at 220° C. for 30 minutes, thereby giving a glass substrate with red pixel and green pixel formed thereon.
(1)-3 Formation of Blue Pixel Member:

A blue pixel member was formed on the red pixel and green pixel-formed glass substrate in the same manner as that for the formation of the red pixel member, for which, however, a coloring photosensitive composition of Comparative Example 14 in JP-A 2009-144126, which had been further dispersed for 30 minutes with a bead disperser Ultra-apex Mill (by Kotobuki Kogyo) using 0.05 mmϕ zirconia beads, was used. The substrate was post-baked in an oven at 230° C. for 30 minutes, thereby giving a color filter substrate.

On the color filter substrate produced in the above, formed was a transparent electrode of ITO (indium tin oxide) through sputtering. Next, according to Example 1 in JP-A 2006-64921, a spacer was formed on the ITO film in the area corresponding to the upper part of the partition wall (black matrix); then the transparent electrode was patterned for PVA mode, and a vertical alignment film of polyimide was formed thereon. The liquid-crystal cell substrate thus produced is a front-side substrate 1.

(2) Front-Side Substrate 2:
(2)-1 Formation of Red Pixel Member:
<Formation of Curable Composition Layer (coating film)>

A coloring photosensitive composition of Comparative Example 12 in JP-A 2009-144126 was dispersed for 1 hour with a bead disperser Ultra-apex Mill (by Kotobuki Kogyo) using 0.05 mmϕ zirconia beads, and the thus-processed composition was applied in a mode of slit-coating, to a glass substrate (550 mm×650 mm) with a black matrix (BM) formed on one surface thereof, on the BM-formed surface thereof, using a slit coating apparatus equipped with a slit head having a slit clearance of 100 μm and a coating effective width of 500 mm, thereby forming a curable composition layer (coating film) on the substrate.

In the slit coating, the distance between the slit and the glass substrate and the flow rate of the coating liquid were so controlled that the thickness of the layer after post-baking could be 2.0 μm. The coating rate was 100 mm/sec.
<Exposure to Light, Development, Rinsing>

Next, the curable composition layer was pre-baked with a hot plate at 80° C. for 120 seconds, and then exposed to light at 90 mJ/cm² through a proximity gap of 180 μm, using an exposure apparatus, Hitachi's LE5565 (illuminance, 20 mW/cm²). The exposed substrate was shower-developed with a 1.0% developer (25° C.) of a potassium hydroxide developer, CDK-1 (by FUJIFILM Electronics Materials) for 60 seconds, and then rinsed with pure water.

In that manner, a red pixel member was formed on the glass substrate. The substrate was post-baked in an oven at 220° C. for 30 minutes, thereby giving a glass substrate with red pixel formed thereon.

(2)-2 Formation of Green Pixel Member:

A green pixel member was formed on the red pixel-formed glass substrate in the same manner as that for the formation of the red pixel member, for which, however, a coloring photosensitive composition of Comparative Example 13 in JP-A 2009-144126, which had been further dispersed for 1 hour with a bead disperser Ultra-apex Mill (by Kotobuki Kogyo) using 0.05 mmφ zirconia beads, was used. The substrate was post-baked in an oven at 220° C. for 30 minutes, thereby giving a glass substrate with red pixel and green pixel formed thereon.

(2)-3 Formation of Blue Pixel Member:

A blue pixel member was formed on the red pixel and green pixel-formed glass substrate in the same manner as that for the formation of the red pixel member, for which, however, a coloring photosensitive composition of Comparative Example 14 in JP-A 2009-144126, which had been further dispersed for 1 hour with a bead disperser Ultra-apex Mill (by Kotobuki Kogyo) using 0.05 mmφ zirconia beads, was used. The substrate was post-baked in an oven at 230° C. for 30 minutes, thereby giving a color filter substrate.

On the color filter substrate produced in the above, formed was a transparent electrode of ITO (indium tin oxide) through sputtering. Next, according to Example 1 in JP-A 2006-64921, a spacer was formed on the ITO film in the area corresponding to the upper part of the partition wall (black matrix); then the transparent electrode was patterned for PVA mode, and a vertical alignment film of polyimide was formed thereon. The liquid-crystal cell substrate thus produced is a front-side substrate 2.

(3) Front-Side Substrate 3:

(3)-1 Formation of Red Pixel Member:

<Formation of Curable Composition Layer (coating film)>

A coloring photosensitive composition of Example 17 in JP-A 2009-144126 was applied in a mode of slit-coating, to a glass substrate (550 mm×650 mm) with a black matrix (BM) formed on one surface thereof, on the BM-formed surface thereof, using a slit coating apparatus equipped with a slit head having a slit clearance of 100 μm and a coating effective width of 500 mm, thereby forming a curable composition layer (coating film) on the substrate.

In the slit coating, the distance between the slit and the glass substrate and the flow rate of the coating liquid were so controlled that the thickness of the layer after post-baking could be 2.0 μm. The coating rate was 100 mm/sec.

<Exposure to Light, Development, Rinsing>

Next, the curable composition layer was pre-baked with a hot plate at 80° C. for 120 seconds, and then exposed to light at 90 mJ/cm$^2$ through a proximity gap of 180 μm, using an exposure apparatus, Hitachi's LE5565 (illuminance, 20 mW/cm$^2$). The exposed substrate was shower-developed with a 1.0% developer (25° C.) of a potassium hydroxide developer, CDK-1 (by FUJIFILM Electronics Materials) for 60 seconds, and then rinsed with pure water.

In that manner, a red pixel member was formed on the glass substrate. The substrate was post-baked in an oven at 220° C. for 30 minutes, thereby giving a glass substrate with red pixel formed thereon.

(3)-2 Formation of Green Pixel Member:

A green pixel member was formed on the red pixel-formed glass substrate in the same manner as that for the formation of the red pixel member, for which, however, a coloring photosensitive composition of Example 18 in JP-A 2009-144126 was used. The substrate was post-baked in an oven at 220° C. for 30 minutes, thereby giving a glass substrate with red pixel and green pixel formed thereon.

(3)-3 Formation of Blue Pixel Member:

A blue pixel member was formed on the red pixel and green pixel-formed glass substrate in the same manner as that for the formation of the red pixel member, for which, however, a coloring photosensitive composition of Example 19 in JP-A 2009-144126 was used. The substrate was post-baked in an oven at 230° C. for 30 minutes, thereby giving a color filter substrate.

On the color filter substrate produced in the above, formed was a transparent electrode of ITO (indium tin oxide) through sputtering. Next, according to Example 1 in JP-A 2006-64921, a spacer was formed on the ITO film in the area corresponding to the upper part of the partition wall (black matrix); then the transparent electrode was patterned for PVA mode, and a vertical alignment film of polyimide was formed thereon. The liquid-crystal cell substrate thus produced is a front-side substrate 3.

(4) Front-Side Substrate 4:

(4)-1 Formation of Red Pixel Member:

<Formation of Curable Composition Layer (Coating Film)>

A coloring photosensitive composition of Example 17 in JP-A 2009-144126 was dispersed for 15 minutes with a bead disperser Ultra-apex Mill (by Kotobuki Kogyo) using 0.05 mmφ zirconia beads, and the thus-processed composition was applied in a mode of slit-coating, to a glass substrate (550 mm×650 mm) with a black matrix (BM) formed on one surface thereof, on the BM-formed surface thereof, using a slit coating apparatus equipped with a slit head having a slit clearance of 100 μm and a coating effective width of 500 mm, thereby forming a curable composition layer (coating film) on the substrate.

In the slit coating, the distance between the slit and the glass substrate and the flow rate of the coating liquid were so controlled that the thickness of the layer after post-baking could be 2.0 μm. The coating rate was 100 mm/sec.

<Exposure to Light, Development, Rinsing>

Next, the curable composition layer was pre-baked with a hot plate at 80° C. for 120 seconds, and then exposed to light at 90 mJ/cm$^2$ through a proximity gap of 180 using an exposure apparatus, Hitachi's LE5565 (illuminance, 20 mW/cm$^2$).

The exposed substrate was shower-developed with a 1.0% developer (25° C.) of a potassium hydroxide developer, CDK-1 (by FUJIFILM Electronics Materials) for 60 seconds, and then rinsed with pure water.

In that manner, a red pixel member was formed on the glass substrate. The substrate was post-baked in an oven at 220° C. for 30 minutes, thereby giving a glass substrate with red pixel formed thereon.

(4)-2 Formation of Green Pixel Member:

A green pixel member was formed on the red pixel-formed glass substrate in the same manner as that for the formation of the red pixel member, for which, however, a coloring photosensitive composition of Example 18 in JP-A 2009-144126, which had been further dispersed for 15 minutes with a bead disperser Ultra-apex Mill (by Kotobuki Kogyo) using 0.05 mmφ zirconia beads, was used. The substrate was post-baked in an oven at 220° C. for 30 minutes, thereby giving a glass substrate with red pixel and green pixel formed thereon.

(4)-3 Formation of Blue Pixel Member:

A blue pixel member was formed on the red pixel and green pixel-formed glass substrate in the same manner as that for the formation of the red pixel member, for which, however, a coloring photosensitive composition of Example 19 in JP-A 2009-144126, which had been further dispersed for 15 minutes with a bead disperser Ultra-apex Mill (by Kotobuki Kogyo) using 0.05 mmφ zirconia beads, was used. The substrate was post-baked in an oven at 230° C. for 30 minutes, thereby giving a color filter substrate.

On the color filter substrate produced in the above, formed was a transparent electrode of ITO (indium tin oxide) through sputtering. Next, according to Example 1 in JP-A 2006-64921, a spacer was formed on the ITO film in the area corresponding to the upper part of the partition wall (black matrix); then the transparent electrode was patterned for PVA mode, and a vertical alignment film of polyimide was formed thereon. The liquid-crystal cell substrate thus produced is a front-side substrate 4.

(5) Front-Side Substrate 5:

A liquid-crystal cell substrate was produced in the same manner as that for the front-side substrate 4, for which, however, the time for dispersion in forming the red pixel member was 30 minutes, the time for dispersion in forming the green pixel member was 30 minutes, and the time for dispersion in forming the blue pixel member was 30 minutes. This is a front-side substrate 5.

(6) Front-Side Substrate 6:

A liquid-crystal cell substrate was produced in the same manner as that for the front-side substrate 4, for which, however, the time for dispersion in forming the red pixel member was 1 hour, the time for dispersion in forming the green pixel member was 1 hour, and the time for dispersion in forming the blue pixel member was 1 hour. This is a front-side substrate 6.

(7) Rear-Side Substrate 1:

A liquid-crystal cell was taken out of a liquid-crystal TV, Sharp's LC-37GE2, and this was disassembled to take out the array substrate disposed on the light source side, and the surface of the substrate was washed with ethanol.

A glass substrate was prepared with a transparent electrode of ITO formed thereon. The transparent electrode was patterned for PVA mode, and a vertical alignment film of polyimide was formed thereon. The glass substrate and the array substrate were stuck to each other, using a matching oil for glass, in such a manner that the glass side of the glass substrate could face the array side of the array substrate. Thus produced, the substrate is a rear-side substrate 1.

(8) Rear-Side Substrate 2:

A rear-side substrate 2 was produced in the same manner as that for the rear-side substrate 1, for which, however, the array substrate taken out from a liquid-crystal TV, Sharp's LC-37GX1W was used in place of the array substrate from Sharp's LC-37GE2.

(9) Rear-Side Substrate 3:

A rear-side substrate 3 was produced in the same manner as that for the rear-side substrate 1, for which, however, the array substrate taken out from a liquid-crystal TV, Sharp's LC-37GX3W was used in place of the array substrate from Sharp's LC-37GE2.

(10) Rear-Side Substrate 4:

A rear-side substrate 4 was produced in the same manner as that for the rear-side substrate 1, for which, however, the array substrate taken out from a liquid-crystal TV, Sharp's LC-32GH3 was used in place of the array substrate from Sharp's LC-37GE2.

5. Preparation of VA-Mode Liquid-Crystal Cell:

(1) Liquid-Crystal Cell 1:

A liquid-crystal cell for a liquid-crystal panel, Sony's KDL-52W5 was prepared. The liquid-crystal cell is a COA-structured VA-mode liquid-crystal cell. This is a liquid-crystal cell 1.

$\Delta$nd(550) of the liquid-crystal cell 1 was measured with AXOMETRICS' AXOSCAN using the associated software, and was 295 nm.

(2) Liquid-Crystal Cells 2 to 20:

Using the front-side substrate and the rear-side substrate according to the combination shown in the following Table, liquid-crystal cells 2 to 20 were produced. Concretely, a UV-curable resin sealant was applied, using a dispenser, to the position corresponding to the black matrix frame provided around the RGB pixel group of the color filter of the front-side substrate to surround the group, then a VA-mode liquid crystal was dropwise applied thereto, and the front-side substrate was stuck to the rear-side substrate. Next, thus stuck together, the substrates were exposed to UV rays, and then heat-treated to cure the sealant, thereby producing a liquid-crystal cell.

Subsequently, $\Delta$nd(550) of each liquid-crystal cell was measured with AXOMETRICS' AXOSCAN using the associated software. Those having $\Delta$nd(550) of 295 nm like the liquid-crystal cell 1 were selected, and these are liquid-crystal cells 2 to 20.

TABLE 9

| | Rear-Side Substrate 1 | Rear-Side Substrate 2 | Rear-Side Substrate 3 | Rear-Side Substrate 4 |
|---|---|---|---|---|
| Front-Side Substrate 1 | Liquid-Crystal Cell 2 | — | — | — |
| Front-Side Substrate 2 | Liquid-Crystal Cell 3 | Liquid-Crystal Cell 7 | Liquid-Crystal Cell 12 | — |
| Front-Side Substrate 3 | Liquid-Crystal Cell 4 | Liquid-Crystal Cell 8 | Liquid-Crystal Cell 13 | Liquid-Crystal Cell 17 |
| Front-Side Substrate 4 | Liquid-Crystal Cell 5 | Liquid-Crystal Cell 9 | Liquid-Crystal Cell 14 | Liquid-Crystal Cell 18 |
| Front-Side Substrate 5 | Liquid-Crystal Cell 6 | Liquid-Crystal Cell 10 | Liquid-Crystal Cell 15 | Liquid-Crystal Cell 19 |
| Front-Side Substrate 6 | — | Liquid-Crystal Cell 11 | Liquid-Crystal Cell 16 | Liquid-Crystal Cell 20 |

(3) Liquid-Crystal Cell 21:

A liquid-crystal cell 21 was produced in the same manner as that for the liquid-crystal cell 20, for which, however, the pillar-like spacer pattern formed in the area corresponding to the upper part of the partition wall of the ITO film on the color filter substrate had a diameter of 16 μm and a mean height of 3.0 μm.

$\Delta$nd(550) of the thus-produced liquid-crystal cell 21 was measured with AXOMETRICS' AXOSCAN using the associated software, and was 240 nm.

(4) Liquid-Crystal Cell 22:

A glass substrate with a transparent electrode of ITO formed thereon was prepared, and a transparent pillar-like spacer pattern having a diameter of 16 μm and a mean height of 3.7 μm was formed on the ITO film of the glass substrate. The transparent electrode was patterned for VA mode, and a vertical alignment film of polyimide was formed thereon to give a front-side substrate.

A UV-curable resin sealant, as patterned like in the liquid-crystal cell 20, was applied to the front-side substrate on the pillar spacer thereon, using a dispenser, then a VA-mode liquid crystal was dropwise applied thereto, and the front-side substrate was stuck to the rear-side substrate. The thus-stuck substrates were irradiated with UV rays and heat-treated to cure the sealant, thereby producing a liquid-crystal cell.

Subsequently, $\Delta$nd(550) of the thus-produced liquid-crystal cell was measured with AXOMETRICS' AXOSCAN using the associated software. One having $\Delta$nd(550) of 295 nm like the liquid-crystal cell 1 was selected, and this is a liquid-crystal cell 22.

(5) Computation of the Member-Contrast Ratio of Front-Side Substrate and Rear-Side Substrate of Liquid-Crystal Cell:

The liquid-crystal cells 1 to 22 were disassembled, in which the substrate disposed on the panel side is a front-side substrate, and the array substrate disposed on the light source side is a rear-side substrate. These were washed with ethanol on their surfaces, and analyzed to compute the member CR of the front-side substrate and the rear-side substrate.

A polarizer (HLC2-2518, by Sanritz) was put on the backlight of a liquid-crystal panel, Sharp's LC-32 GH5, and on this, the front-side substrate or the rear-side substrate of the above-mentioned liquid-crystal cell fitted to a rotary stage SGSP-120YAW (by Sigma Koki) was disposed in parallel to each other at a distance of 2 mm from the polarizer. Briefly, these were so disposed that the array wiring on the rear-side substrate and the black matrix on the front-side substrate could correspond to the polarization axis of the polarizer. Further on this, a polarizer, HLC2-2518 (by Sanritz) fitted to a rotary stage was disposed so that the distance between the polarizers could be 52 mm. Using a tester BM5A (by TOPCON) in a dark room, the brightness at the time of black level and white level of display in the normal direction was measured, and the front contrast ratio A (white brightness/black brightness) was computed. In this, the polarizer was rotated, and the lowest brightness was the brightness at the time of black level of display. Then, the polarizer was rotated by 90 degrees, and the brightness in this state was the brightness at the time of white level of display.

Next, in the above embodiment, the color filter substrate or the array substrate was removed, and the brightness at the time of black level or white level of display with the polarizer alone was measured, and the front contrast ratio B was computed. Subsequently, to remove the influence of the front contrast ratio B with the polarizer on the front contrast ratio A, the member-contrast ratio was computed according to the following formula:

Member-contrast ratio=1/(1/front contrast ratio $A$−1/front contrast ratio $B$).

Based on the computed member-contrast ratio, the member-contrast ratio was computed according to the following formula, and the data are shown in the following Table.

Member-contrast Ratio $(CR_f/CR_r)$=(member-contrast ratio of front-side substrate)/(member-contrast ratio of rear-side substrate).

TABLE 10

|  | Member-contrast ratio $(CR_f/CR_r)$ |
| --- | --- |
| Liquid-Crystal Cell 1 | 13.5 |
| Liquid-Crystal Cell 2 | 2.5 |
| Liquid-Crystal Cell 3 | 2.8 |
| Liquid-Crystal Cell 4 | 3.2 |
| Liquid-Crystal Cell 5 | 3.5 |
| Liquid-Crystal Cell 6 | 3.8 |
| Liquid-Crystal Cell 7 | 2.6 |
| Liquid-Crystal Cell 8 | 3.0 |
| Liquid-Crystal Cell 9 | 3.2 |

TABLE 10-continued

|  | Member-contrast ratio $(CR_f/CR_r)$ |
| --- | --- |
| Liquid-Crystal Cell 10 | 3.5 |
| Liquid-Crystal Cell 11 | 3.8 |
| Liquid-Crystal Cell 12 | 2.4 |
| Liquid-Crystal Cell 13 | 2.8 |
| Liquid-Crystal Cell 14 | 3.1 |
| Liquid-Crystal Cell 15 | 3.3 |
| Liquid-Crystal Cell 16 | 3.6 |
| Liquid-Crystal Cell 17 | 2.6 |
| Liquid-Crystal Cell 18 | 2.8 |
| Liquid-Crystal Cell 19 | 3.0 |
| Liquid-Crystal Cell 20 | 3.3 |
| Liquid-Crystal Cell 21 | 3.3 |
| Liquid-Crystal Cell 22 | 98 |

6. Production and Evaluation of VA-Mode Liquid-Crystal Display Device:

(1) Production of VA-Mode Liquid-Crystal Display Device:

Any of the liquid-crystal cells 2 to 20 was selected. A polarizing film produced in the manner mentioned below was directly stuck to the surface of the rear-side substrate of the thus-selected liquid-crystal cell.

(Production of Polarizing Film)

A polyvinyl alcohol (PVA) film having a thickness of 80 μm was dyed by dipping it in an aqueous iodine solution having an iodine concentration of 0.05% by mass at 30° C. for 60 seconds, then stretched in the machine direction by 5 times the original length while dipped in an aqueous boric acid solution having a boric acid concentration of 4% by mass for 60 seconds, and thereafter dried at 50° C. for 4 minutes to give a polarizing film having a thickness of 20

The film 8 was stuck to the surface of the polarizing film, using a polyvinyl alcohol adhesive.

Of the polarizers produced in the above, the polarizer was prepared in which the inner protective film of the polarizing film was the film 1 and the outer protective film was the film 8. The polarizer was stuck to the surface of the front-side substrate of the liquid-crystal cell. The surface of the film 1 was stuck to the surface of the front-side substrate.

These were so stuck that the absorption axis of the rear-side polarizing element could be perpendicular to the absorption axis of the polarizing element of the front-side polarizer.

Next, a backlight unit was disposed outside the film 8 stuck to the surface of the rear-side polarizing element, thereby constructing VA-mode liquid-crystal display devices 1 to 19. The backlight was KDL-52W5 (by Sony).

In the manner as above, VA-mode liquid-crystal display devices 1 to 19 were produced.

(2) Measurement of Front Contrast Ratio:

Using a tester BM5A (by TOPCON) in a dark room, the brightness at the time of black level and white level of display in the normal direction to the panel of the liquid-crystal display device was measured, and from the data, the front contrast ratio (white brightness/black brightness) was computed. In this, the distance between the tester and the panel was 700 mm.

The results are shown in the following Table.

TABLE 11

| Liquid-crystal display device | Front-side polarizing plate | | Liquid-crystal cell | | Rear-side polarizing plate | | Front contrast ratio |
| --- | --- | --- | --- | --- | --- | --- | --- |
|  | Outer protective film | Inner protective film | Rear-side Substrate | No. $(CR_f/CR_r)$ | Inner protective film | Outer Protective film |  |
| 1 | Film 8 | Film 1 | Rear-side Substrate 1 | 2 (2.5) | — | Film 8 | 2,530 |
| 2 | Film 8 | Film 1 |  | 3 (2.8) | — | Film 8 | 2,550 |

TABLE 11-continued

| Liquid-crystal display device | Front-side polarizing plate | | Liquid-crystal cell | | Rear-side polarizing plate | | Front contrast ratio |
|---|---|---|---|---|---|---|---|
| | Outer protective film | Inner protective film | Rear-side Substrate | No. (CR$_f$/CR$_r$) | Inner protective film | Outer Protective film | |
| 3 | Film 8 | Film 1 | | 4 (3.2) | — | Film 8 | 2,650 |
| 4 | Film 8 | Film 1 | | 5 (3.5) | — | Film 8 | 2,770 |
| 5 | Film 8 | Film 1 | | 6 (3.8) | — | Film 8 | 2,950 |
| Comparative Example | Film 8 | Film 1 | | 4 (3.2) | Film 8 | Film 8 | 2,550 |
| 6 | Film 8 | Film 1 | Rear-side Substrate 2 | 7 (2.6) | — | Film 8 | 2,780 |
| 7 | Film 8 | Film 1 | | 8 (3.0) | — | Film 8 | 2,820 |
| 8 | Film 8 | Film 1 | | 9 (3.2) | — | Film 8 | 2,920 |
| 9 | Film 8 | Film 1 | | 10 (3.5) | — | Film 8 | 3,080 |
| 10 | Film 8 | Film 1 | | 11 (3.8) | — | Film 8 | 3,260 |
| Comparative Example | Film 8 | Film 1 | | 8 (3.0) | Film 8 | Film 8 | 2,720 |
| 11 | Film 8 | Film 1 | Rear-side Substrate 3 | 12 (2.4) | — | Film 8 | 2,910 |
| 12 | Film 8 | Film 1 | | 13 (2.8) | — | Film 8 | 2,940 |
| 13 | Film 8 | Film 1 | | 14 (3.1) | — | Film 8 | 3,020 |
| 14 | Film 8 | Film 1 | | 15 (3.3) | — | Film 8 | 3,170 |
| 15 | Film 8 | Film 1 | | 16 (3.6) | — | Film 8 | 3,310 |
| Comparative Example | Film 8 | Film 1 | | 14 (3.1) | Film 8 | Film 8 | 2,910 |
| 16 | Film 8 | Film 1 | Rear-side Substrate 4 | 17 (2.6) | — | Film 8 | 3,240 |
| 17 | Film 8 | Film 1 | | 18 (2.8) | — | Film 8 | 3,270 |
| 18 | Film 8 | Film 1 | Rear-side Substrate 4 | 19 (3.0) | — | Film 8 | 3,310 |
| 19 | Film 8 | Film 1 | | 20 (3.3) | — | Film 8 | 3,460 |
| Comparative Example | Film 8 | Film 1 | | 19 (3.0) | Film 8 | Film 8 | 3,190 |

Figure 3:
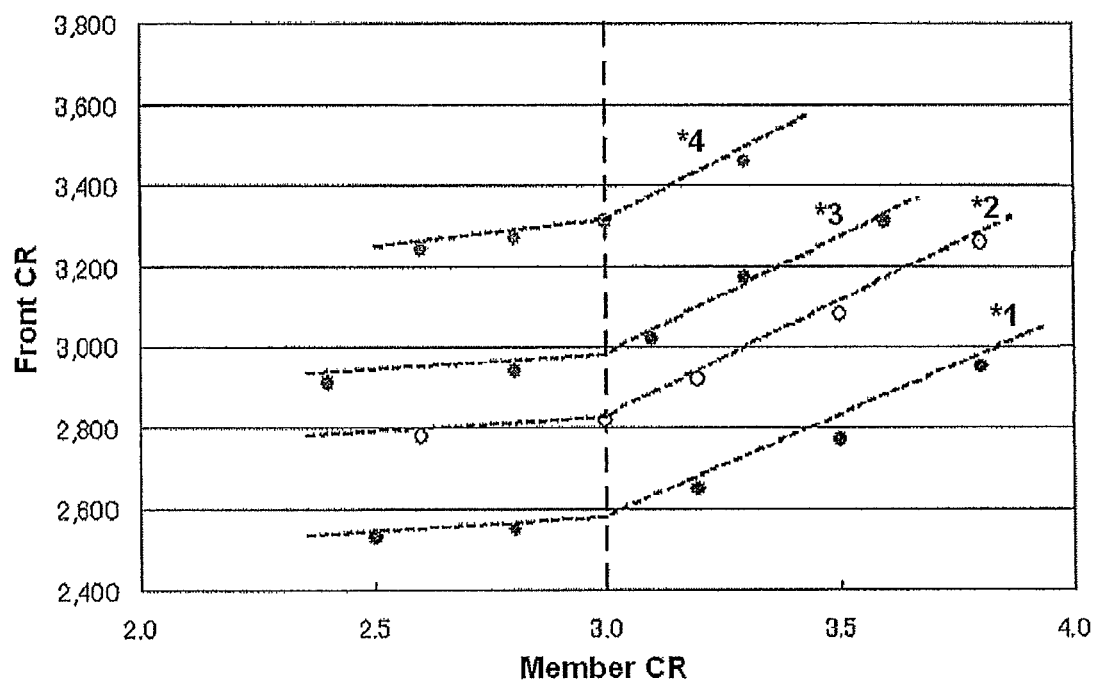
FIG. 3 is a graph for explaining the effect of Examples of the invention.

The above data were plotted in the graph of FIG. 3, in which the horizontal axis indicates the member CR ratio (CR$_f$/CR$_r$) of the substrates and the horizontal axis indicates the front contrast ratio. As in FIG. 3, it is understood that, in all the cell substrate cases, the front contrast ratio significantly increases when the member CR ratio of the substrates is equal to or more than 3.

In the liquid-crystal cell of which the member CR ratio (CR$_f$/CR$_r$) of the substrates is around 3.0, the film 8 was disposed between the rear-side polarizing element and the rear-side substrate, thereby constructing a comparative VA-mode liquid-crystal display device, and the front contrast ratio of the display device was measured. The data are also shown in the above Table.

7. Production and Evaluation of VA-Mode Liquid-Crystal Display Device:
(1) Production of VA-Mode Liquid-Crystal Display Device of the Invention:

Any of the liquid-crystal cells 1, 20, 21 and 22 was selected. A polarizing film produced in the manner mentioned below was stuck to the surface of the rear-side substrate of the thus-selected liquid-crystal cell.

(Production of Polarizing Film)

A polyvinyl alcohol (PVA) film having a thickness of 80 μm was dyed by dipping it in an aqueous iodine solution having an iodine concentration of 0.05% by mass at 30° C. for 60 seconds, then stretched in the machine direction by 5 times the original length while dipped in an aqueous boric acid solution having a boric acid concentration of 4% by mass for 60 seconds, and thereafter dried at 50° C. for 4 minutes to give a polarizing film having a thickness of 20 μm.

Any of the film 8 or 11 was stuck to the surface of the polarizing film in the manner shown in the following Table, using a polyvinyl alcohol adhesive.

As the front-side polarizer, the polarizer having an inner protective film and an outer protective film for the polarizing film as in the combination shown in the following Table was selected from those produced in the above, and the polarizer was stuck to the surface of the front-side substrate of the liquid-crystal cell.

These were so stuck to each other that the absorption axis of the rear-side polarizing element could be perpendicular to the absorption axis of the polarizing element of the front-side polarizer.

Next, a backlight unit was disposed outside the film 8 or 11 stuck to the surface of the rear-side polarizing element, thereby constructing VA-mode liquid-crystal display devices 20 to 32.

In the liquid-crystal display devices having the liquid-crystal cell 1, 20 or 21, the backlight was KDL-52W5.

In the liquid-crystal display device having the liquid-crystal cell 22, the backlight unit was one having LEDs of three colors BGR. In this, the LEDs of the three colors BGR of the backlight unit 30 were alternately driven to emit light at 180 Hz in a field-sequential display mode.

In the manner as above, VA-mode liquid-crystal display devices 20 to 32 were produced.

(2) Production of VA-Mode Liquid-Crystal Display Device for Comparison:

Of the polarizers produced in the above, those having an inner protective film and an outer protective film for the polarizing element in the combination shown in the following Table were selected.

Any of the liquid-crystal cells 1, 20, 21 and 22 was selected. The polarizer was stuck to the surface of the rear-side substrate and to the surface of the front-side substrate. These were so stuck to each other that the absorption axis of the rear-side polarizing element could be perpendicular to the absorption axis of the polarizing element of the front-side polarizer.

Next, a backlight unit was disposed outside the rear-side polarizer, thereby constructing VA-mode liquid-crystal display devices 1 to 7 for comparison.

In the liquid-crystal display devices having the liquid-crystal cell 1, 20 or 21, the backlight was KDL-52W5 (by Sony).

In the liquid-crystal display device having the liquid-crystal cell 22, the backlight unit was one having LEDs of three colors BGR. In this, the LEDs of the three colors BGR of the backlight unit were alternately driven to emit light at 180 Hz in a field-sequential display mode.

In the manner as above, VA-mode liquid-crystal display devices 1 to 7 for comparison were produced.

(3) Evaluation of VA-Mode Liquid-Crystal Display Device:

Thus produced, the VA-mode liquid-crystal display devices 20 to 32 of the invention and the VA-mode liquid-crystal display devices 1 to 7 for comparison were tested and evaluated in the manner mentioned below. The evaluation results are shown in the following Table.

(3)-1 Measurement of Front Contrast Ratio:

Using a tester BM5A (by TOPCON) in a dark room, the brightness at the time of black level and white level of display in the normal direction to the panel of the liquid-crystal display device was measured, and from the data, the front contrast ratio (white brightness/black brightness) was computed. In this, the distance between the tester and the panel was 700 mm.

Subsequently, the front contrast ratio was computed according to the formula mentioned below, based on the front contrast ratio in a standard state.

Front Contrast Ratio=(front contrast ratio in sample state)/(front contrast ratio in standard state).

The standard state is the liquid-crystal display device of Comparative Example 3 in the following Table, for the liquid-crystal display device having the liquid-crystal cell 1, and its front contrast ratio is 4320. For the liquid-crystal display device having the liquid-crystal cell 20, the standard state is the liquid-crystal display device of Comparative Example 4 in the following Table, and its front contrast ratio is 3320. For the liquid-crystal display device having the liquid-crystal cell 21, the standard state is the liquid-crystal display device of Comparative Example 6 in the following Table, and its front contrast ratio is 2600. For the liquid-crystal display device having the liquid-crystal cell 22, the standard state is the liquid-crystal display device of Comparative Example 7 in the following Table, and its front contrast ratio is 4350.

(3)-2 Viewing Angle Contrast Ratio (Contrast Ratio in Oblique Direction):

Using a tester BM5A (by TOPCON) in a dark room, the brightness at the time of black level and white level of display was measured at an azimuth angle of 45 degrees and a polar angle of 60 degrees from the front of the device. From the data, the viewing angle contrast ratio (white brightness/black brightness) was computed, and the tested devices were evaluated as follows:

○: The viewing angle contrast ratio is 50 or more.

Δ: The viewing angle contrast ratio is from 25 to less than 50.

x: The viewing angle contrast ratio is less than 25 (unacceptable).

(3)-3 Circular Unevenness:

The produced panels were left in an environment at a temperature of 40° C. and a relative humidity of 90% for 4 days. After thus aged, the panels were transferred into an environment at a temperature of 36° C. and a relative humidity of 30%.

Afterwards, the panel was put on a light table, observed in a dark room, and evaluated for the circular unevenness according to the criteria mentioned below.

○○: Within 72 hours after the panel was put on the lighted light table, no light leakage was seen.

○: Some light leakage was seen, but disappeared within 36 hours after the panel was put on the lighted light table, and thereafter no light leakage was seen.

Δ: Light leakage was seen, and did not disappear within 36 hours after the panel was put on the lighted light table, but thereafter disappeared within 72 hours (unacceptable).

x: Light leakage was seen, and did not disappear within 72 hours after the panel was put on the lighted light table (unacceptable).

TABLE 12

| Liquid-crystal display device | Front-side polarizing plate | | Liquid-crystal cell | Rear-side Polarizing plate | | Front contrast ratio | Viewing angle contrast ratio | Circular unevenness |
|---|---|---|---|---|---|---|---|---|
| | Outer protective film | Inner protective film | | Inner protective film | Outer protective film | | | |
| Example 20 | Film 8 | Film 1 | 1 | — | Film 8 | 104% | o | oo |
| Example 21 | Film 8 | Film 4 | 1 | — | Film 8 | 104% | o | oo |
| Example 22 | Film 8 | Film 3 | 1 | — | Film 8 | 104% | o | oo |
| Example 23 | Film 8 | Film 2 | 1 | — | Film 8 | 104% | o | oo |
| Example 24 | Film 8 | Film 5 | 1 | — | Film 8 | 104% | o | oo |
| Example 25 | Film 8 | Film 10 | 1 | — | Film 8 | 104% | o | oo |
| Example 26 | Film 11 | Film 10 | 1 | — | Film 8 | 104% | o | oo |
| Example 27 | Film 8 | Film 10 | 1 | — | Film 11 | 104% | o | oo |
| Example 28 | Film 11 | Film 10 | 1 | — | Film 11 | 104% | o | oo |
| Example 29 | Film 8 | Film 9 | 1 | — | Film 8 | 104% | Δ | oo |
| Example 30 | Film 8 | Film 1 | 20 | — | Film 8 | 104% | o | o |
| Example 31 | Film 8 | Film 7 | 21 | — | Film 8 | 104% | o | o |
| Example 32 | Film 8 | Film 1 | 22 | — | Film 8 | 106% | o | o |
| Comparative Example 1 | Film 8 | nothing | 1 | Film 1 | Film 8 | 75% | o | x |
| Comparative Example 2 | Film 8 | Film 8 | 1 | Film 7 | Film 8 | 72% | o | x |
| Comparative Example 3 | Film 8 | Film 7 | 1 | Film 8 | Film 8 | 100% | o | Δ |
| Comparative Example 4 | Film 8 | Film 7 | 20 | Film 8 | Film 8 | 100% | o | Δ |
| Comparative Example 5 | Film 8 | Film 8 | 20 | Film 7 | Film 8 | 82% | o | x |

TABLE 12-continued

| Liquid-crystal display device | Front-side polarizing plate | | Liquid-crystal cell | Rear-side Polarizing plate | | Viewing | | Circular unevenness |
|---|---|---|---|---|---|---|---|---|
| | Outer protective film | Inner protective film | | Inner protective film | Outer protective film | Front contrast ratio | angle contrast ratio | |
| Comparative Example 6 | Film 8 | Film 6 | 21 | Film 8 | Film 8 | 100% | ○ | Δ |
| Comparative Example 7 | Film 8 | Film 7 | 22 | Film 8 | Film 8 | 100% | ○ | Δ |

From the above results, it is known that the VA-mode liquid-crystal display devices, which comprise any of the liquid-crystal cell 1, 20, 21 or 22 having a member CR ratio ($CR_f/CR_r$) of the substrates of at least 3 and in which the rear-side polarizing element is directly stuck to the rear-side substrate, could have a significantly improved front contrast ratio.

Further, in the liquid-crystal cell 1, a COA substrate was used as the rear-side substrate, and it can be understood that, in the liquid-crystal display devices of Examples 20 to 29 of the invention comprising the liquid-crystal cell 1, the circular unevenness was reduced.

In Examples 20 to 28 in which any of the films 1 to 5 or 10 having Re(550) of 60 nm and Rth(550) of 250 nm was disposed between front-side polarizing element and the front-side substrate, the liquid-crystal display devices had a high viewing angle contrast ratio and had good viewing angle characteristics.

On the other hand, the liquid-crystal display device of Example 29 had a high front contrast ratio like the liquid-crystal display device of Example 20, but the viewing angle contrast ratio thereof was somewhat low. This may be because Rth(550) of the film 9 used as the front-side retardation film could satisfy $\Delta nd(550)-70 \leq Rth(550) \leq \Delta nd(550)-10$ but it was near the lowermost limit of the range.

Reference Example

A VA-mode liquid-crystal display device was produced and evaluated in the same manner as that for the liquid-crystal display device of Example 20, for which, however, the film 8 and a film Z-TAC (by FUJIFILM, having Re(550) of 0.5 nm and Rth(550) of −0.9 nm) were used in place of the film 1 as the front-side retardation film.

The front contrast ratio of the device was high like that of the liquid-crystal display device of Example 20; but as compared with the liquid-crystal display device of Example 20, the viewing angle contrast ratio of the device produced here was low. This may be because the optical characteristics of the film 8 and the film Z-TAC used as the front-side retardation film did not satisfy $\Delta nd(550)-70 \leq Rth(550) \leq \Delta nd(550)-10$ and therefore the films were unsatisfactory for compensation for the viewing angle characteristics of the VA-mode liquid-crystal display device.

What is claimed is:

1. A VA-mode liquid-crystal display device comprising at least a front-side polarizing element, a rear-side polarizing element, and a VA-mode liquid-crystal cell disposed between the front-side polarizing element and the rear-side polarizing element;

wherein the VA-mode liquid-crystal cell comprises a front-side substrate, a rear-side substrate, and a liquid-crystal layer disposed between them, wherein the ratio of the member-contrast ratio ($CR_f$) of the front-side substrate to the member-contrast ratio ($CR_r$) of the rear-side substrate, $CR_f/CR_r$ satisfies the following relational formula:

$$3 \leq CR_f/CR_r,$$

wherein the rear-side substrate and the front-side substrate include any constitutive member(s) of the VA-mode liquid-crystal cell disposed on the respective substrates, wherein the rear-side polarizing element is directly stuck to the VA-mode liquid-crystal cell, and wherein the VA-mode liquid-crystal display device further comprises a retardation region comprising one or more retardation layers between the front-side polarizing element and the VA-mode liquid-crystal cell, and wherein the retardation region satisfies the following formulae:

$$30 \text{ nm} \leq Re(550) \leq 90 \text{ nm},$$

$$170 \text{ nm} \leq Rth(550) \leq 300 \text{ nm, and}$$

$$\Delta nd(550)-70 \leq Rth(550) \leq \Delta nd(550)-10,$$

in which d means the thickness (nm) of the liquid-crystal layer of the VA-mode liquid-crystal cell; $\Delta n(\lambda)$ means the refractivity anisotropy of the liquid-crystal layer of the VA-mode liquid-crystal cell at a wavelength $\lambda$; $\Delta nd(\lambda)$ means the product of $\Delta n(\lambda)$ and d; and $Rth(\lambda)$ means the retardation (nm) in the thickness direction of the retardation region at a wavelength $\lambda$.

2. The VA-mode liquid-crystal display device according to claim 1, wherein the retardation region is formed of a cellulose acylate film or contains a cellulose acylate film.

3. The VA-mode liquid-crystal display device according to claim 1, wherein the retardation region is formed of a cyclic olefin polymer film or contains a cyclic olefin polymer film.

4. The VA-mode liquid-crystal display device according to claim 1, which includes a backlight unit sequentially emitting independent three primary colors and is operated according to a field sequential operation mode.

5. The VA-mode liquid-crystal display device according to claim 1, wherein the VA-mode liquid-crystal cell has a color filter layer and wherein the color filter layer is disposed between the liquid-crystal layer and the rear-side polarizing element.

6. The VA-mode liquid-crystal display device according to claim 1, which has a front contrast ratio of at least 1500.

7. The VA-mode liquid-crystal display device according to claim 2, which includes a backlight unit sequentially emitting independent three primary colors and is operated according to a field sequential operation mode.

8. The VA-mode liquid-crystal display device according to claim 3, which includes a backlight unit sequentially emitting independent three primary colors and is operated according to a field sequential operation mode.

9. The VA-mode liquid-crystal display device according to claim 4, wherein the VA-mode liquid-crystal cell has a color filter layer and wherein the color filter layer is disposed between the liquid-crystal layer and the rear-side polarizing element.

10. The VA-mode liquid-crystal display device according to claim 7, wherein the VA-mode liquid-crystal cell has a color filter layer and wherein the color filter layer is disposed between the liquid-crystal layer and the rear-side polarizing element.

11. The VA-mode liquid-crystal display device according to claim 8, wherein the VA-mode liquid-crystal cell has a color filter layer and wherein the color filter layer is disposed between the liquid-crystal layer and the rear-side polarizing element.

12. The VA-mode liquid-crystal display device according to claim 1, wherein each of the front-side polarizing element and the rear-side polarizing element is a linear polarizing film.

13. The VA-mode liquid-crystal display device according to claim 12, wherein the retardation region is formed of a cellulose acylate film or contains a cellulose acylate film.

14. The VA-mode liquid-crystal display device according to claim 12, wherein the retardation region is formed of a cyclic olefin polymer film or contains a cyclic olefin polymer film.

15. The VA-mode liquid-crystal display device according to claim 12, which includes a backlight unit sequentially emitting independent three primary colors and is operated according to a field sequential operation mode.

16. The VA-mode liquid-crystal display device according to claim 12, wherein the VA-mode liquid-crystal cell has a color filter layer and wherein the color filter layer is disposed between the liquid-crystal layer and the rear-side polarizing element.

17. The VA-mode liquid-crystal display device according to claim 12, which has a front contrast ratio of at least 1500.

* * * * *